United States Patent
Wahlgren et al.

(10) Patent No.: US 12,442,256 B2
(45) Date of Patent: *Oct. 14, 2025

(54) FLOAT APPARATUS

(71) Applicant: Eddy Pump Corporation, El Cajon, CA (US)

(72) Inventors: Daniel Wahlgren, Escondido, CA (US); Hector Duran, El Cajon, CA (US)

(73) Assignee: Eddy Pump Corporation, El Cajon, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 17/832,827

(22) Filed: Jun. 6, 2022

(65) Prior Publication Data

US 2023/0250697 A1    Aug. 10, 2023

Related U.S. Application Data

(63) Continuation-in-part of application No. 17/668,099, filed on Feb. 9, 2022, now Pat. No. 11,834,910.

(51) Int. Cl.
*E21B 17/01* (2006.01)
*F16L 1/24* (2006.01)

(52) U.S. Cl.
CPC ............ *E21B 17/012* (2013.01); *F16L 1/24* (2013.01)

(58) Field of Classification Search
CPC .......... E21B 17/012; E21B 17/01; F16L 1/24; F16L 1/20; B63B 22/00; B63B 22/021; E02B 17/0017; E02B 2017/0095
USPC .............. 441/133, 1; 405/171, 216; 166/350
See application file for complete search history.

(56) References Cited

U.S. PATENT DOCUMENTS

| | | | |
|---|---|---|---|
| 6,004,074 A | 12/1999 | Shanks, II | |
| 6,155,748 A | 12/2000 | Allen et al. | |
| 6,241,425 B1 | 6/2001 | Kazim | |
| 6,402,431 B1 | 6/2002 | Nish | |
| 8,152,581 B2 * | 4/2012 | Kato | B63B 27/24 441/13 |
| 9,316,064 B2 | 4/2016 | Patriciu | |
| 2008/0251668 A1 * | 10/2008 | Stokes | F16L 1/24 248/230.4 |

(Continued)

FOREIGN PATENT DOCUMENTS

WO    2016191490 A1    12/2016

OTHER PUBLICATIONS

European Search Report issued Jul. 10, 2023 in corresponding European Application No. 22215507.9.

*Primary Examiner* — Tara Schimpf
*Assistant Examiner* — Patrick F Lambe
(74) *Attorney, Agent, or Firm* — Global IP Counselors, LLP

(57) ABSTRACT

A float apparatus includes a buoyant device that has an outer surface with a first end portion, a second end portion and an elongated portion. The elongated portion extends from the first end portion to the second end portion. The buoyant device is shaped and configured to attach to a conduit. The elongated portion of the outer surface has a concaved section that extends from the first end portion to the second end portion. The concaved section has a shape that complements an outer radius of the conduit with the buoyant device attached to the conduit.

20 Claims, 27 Drawing Sheets

(56) References Cited

U.S. PATENT DOCUMENTS

2015/0068759 A1* 3/2015 Harbison .............. E21B 17/012
                                                        166/350
2016/0348809 A1* 12/2016 Elder ...................... E02F 7/023
2018/0252334 A1* 9/2018 Harrop ................... F16B 2/065

* cited by examiner

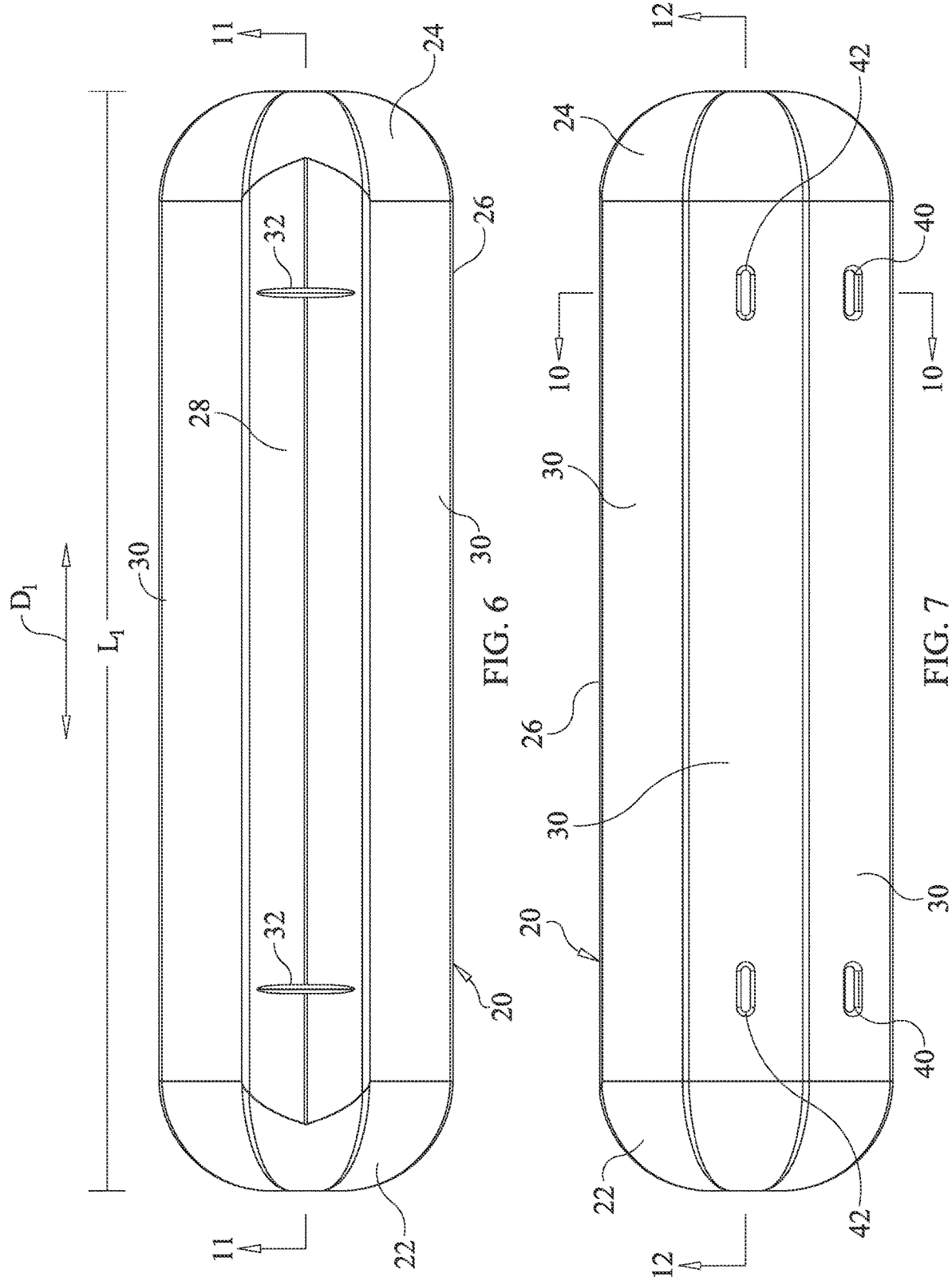

FLOAT APPARATUS

CROSS-REFERENCE TO RELATED APPLICATIONS

This U.S. patent application is a continuation-in-part of U.S. patent Ser. No. 17/668,099, filed on Feb. 9, 2022, the entire contents of which are hereby incorporated herein by reference.

BACKGROUND

Technical Field

The present disclosure generally relates to a slurry transporting riser assembly. More specifically, the present disclosure relates to buoyant device of slurry transporting riser assembly where the buoyant device has an outer surface portion that complements an outer radius of a slurry pipe with the buoyant device attached to the slurry pipe.

Background Information

Slurry pipes (also known as risers) are typically used in a large body of liquid and extend from a deep portion of the body of liquid to above the surface of the body of liquid. In some applications, the pipe or riser requires added buoyancy to keep an upper end of the slurry pipe near or above the surface of the body of liquid.

SUMMARY

One object of the present disclosure is to provide a slurry pipe with a buoyant device or plurality of buoyant devices that are simple to install to the slurry pipe and include a surface section that receives and mates with a portion of the outer surface of the slurry pipe.

In view of the state of the known technology, one aspect of the present disclosure is to provide a slurry transporting riser assembly with a buoyant device that has an outer surface with a first end portion, a second end portion and an elongated portion. The elongated portion extends from the first end portion to the second end portion. The buoyant device is shaped and configured to attach to a slurry pipe. The elongated portion of the outer surface has a concaved section that extends from the first end portion to the second end portion. The concaved section has a shape that complements an outer radius of the slurry pipe with the buoyant device attached to the slurry pipe.

BRIEF DESCRIPTION OF THE DRAWINGS

Referring now to the attached drawings which form a part of this original disclosure:

FIG. 6 is a first side view of the buoyant device depicted in FIG. 5 showing the outer surface, the first end, the second end, the elongated portion, the concaved area and the pair of projections within the concaved area in accordance with the first embodiment;

FIG. 7 is a second side view of the buoyant device depicted in FIG. 5 showing the outer surface, the first end, the second end, and first and second strap receiving tunnels in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
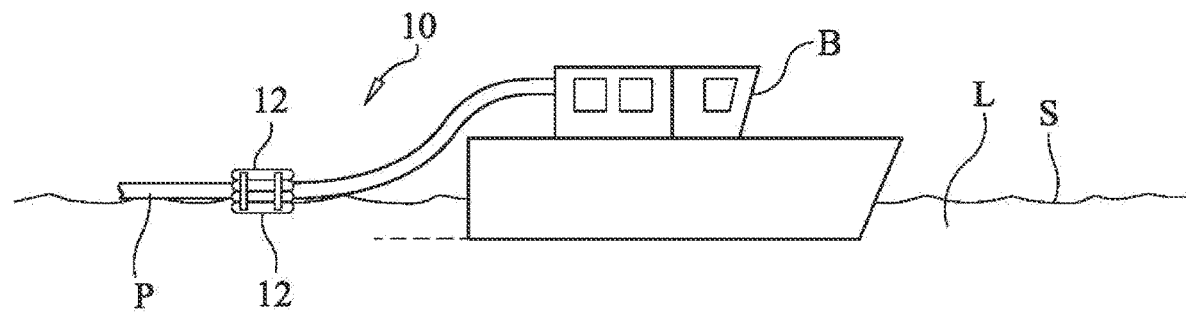
FIG. 1 is a schematic diagram of slurry transporting riser assembly used with a large boat to bring slurry from a body of liquid to the surface of the liquid via a slurry pipe that includes a plurality of buoyant devices attached to and surrounding the slurry pipe in accordance with a first embodiment.
Figure 2:
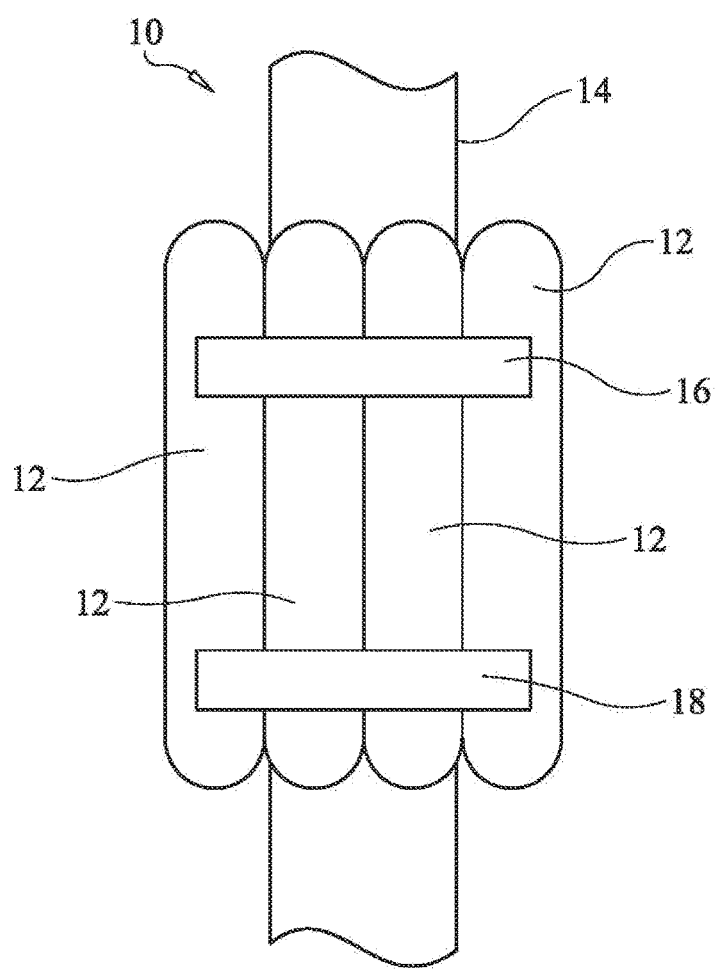
FIG. 2 is an enlarged portion of FIG. 1 showing the slurry pipe with the plurality of buoyant devices strapped to the slurry pipe in accordance with the first embodiment.

Referring initially to FIGS. 1 and 2, a float apparatus 10 (alternatively referred to as a slurry transporting riser assembly 10) having at least one buoyant device 12 is configured to attach to a pipe 14 (also referred to as the pipe P or conduit P) is illustrated in accordance with a first embodiment.

Figure 3:
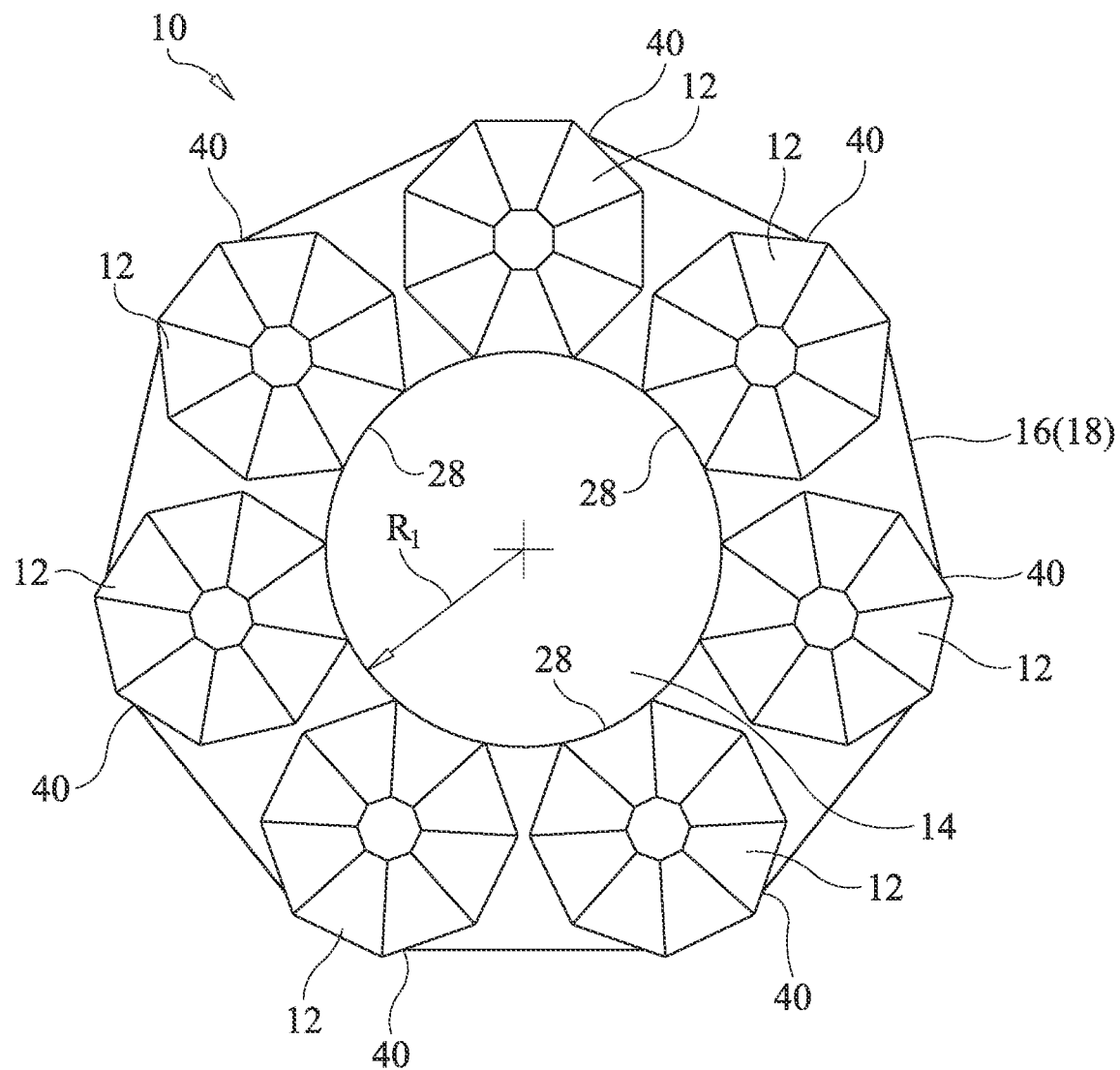
FIG. 3 is a top view of the slurry pipe and a plurality of buoyant devices attached thereto via a pair of straps in accordance with the first embodiment.

The slurry transporting riser assembly 10 can be used in any of a variety of applications where a slurry is to be pumped from beneath the surface S of a liquid L or slurry mixture to a location above the surface S of the liquid L or slurry mixture. In one example depicted in FIG. 1, the slurry transporting riser assembly 10 is used with a floating vessel or boat B that is on the surface of a body of water with the liquid L such as a river or canal where, for example, a dredging operation is being conducted. Slurry from the bottom of the river or canal is pumped through a pipe 14 to the boat B and then further to a shoreline (not shown) along the river or canal. An outer surface of the pipe 14 (also referred to as a slurry pipe and a riser) has at least a portion thereof having a cylindrically shape. The outer surface of the pipe 14 also defines a pipe radius $R_1$, as shown in FIG. 3.

Figure 4:
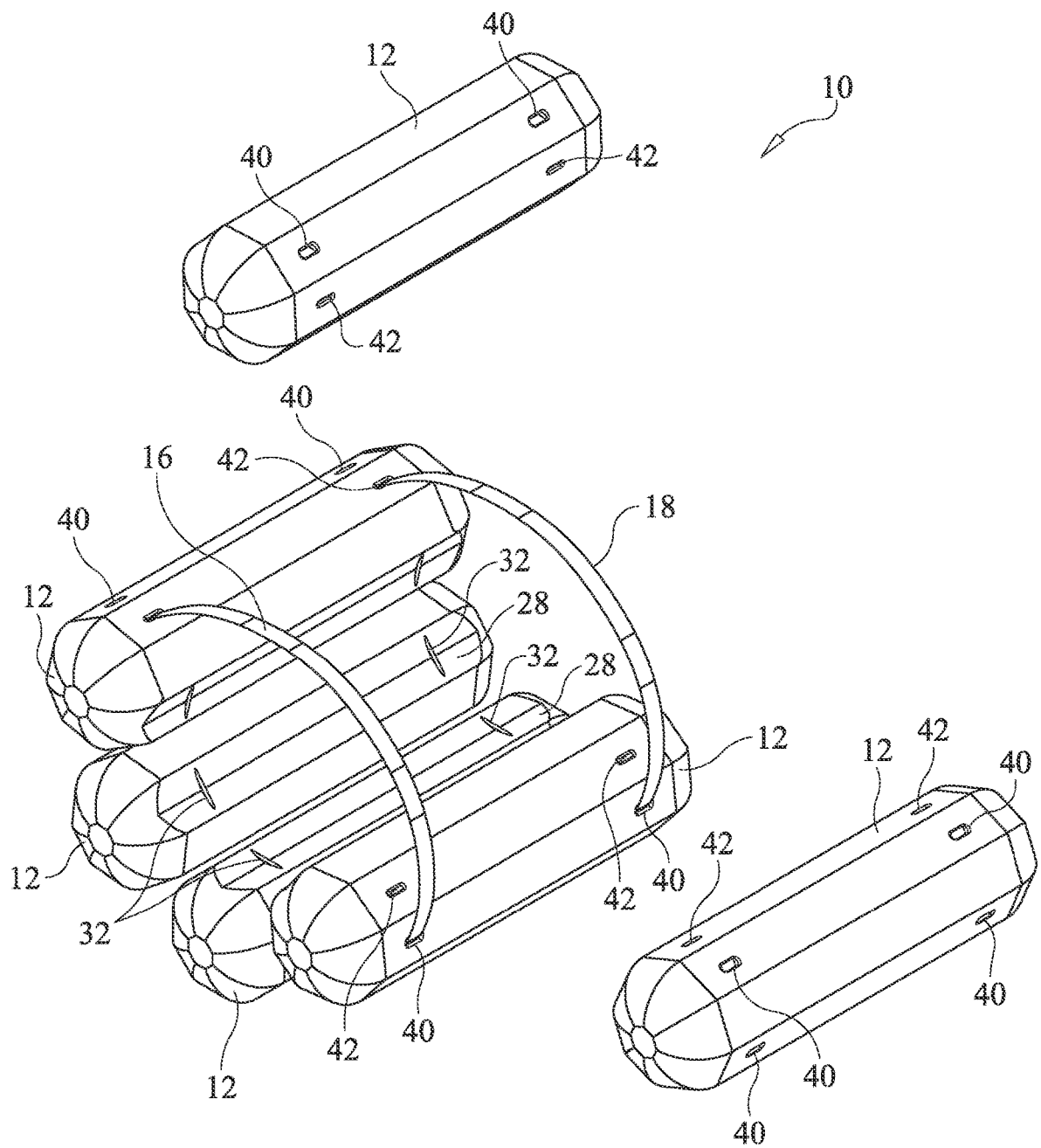
FIG. 4 is an exploded view of the plurality of buoyant devices and the pair of straps with the pipe removed in accordance with the first embodiment

An upper portion of the pipe 14 is preferably kept near the surface S of the liquid L by one or more of the buoyant devices 12, as shown in FIG. 1. As shown in FIGS. 2-4, a plurality of the buoyant devices 12 are attached to the pipe 14 via straps 16 and 18, in a manner described further below following a description of one of the buoyant devices 12.

In the first embodiment shown in FIGS. 5-12 and described below, one or a plurality of buoyant devices 12 can be used with a single pipe 14. Each of the plurality of the buoyant devices 12 are identical to one another. Therefore, description of one of the buoyant devices 12 applies to all of the plurality of the buoyant devices 12 depicted in FIGS. 1-4.

Figure 8:
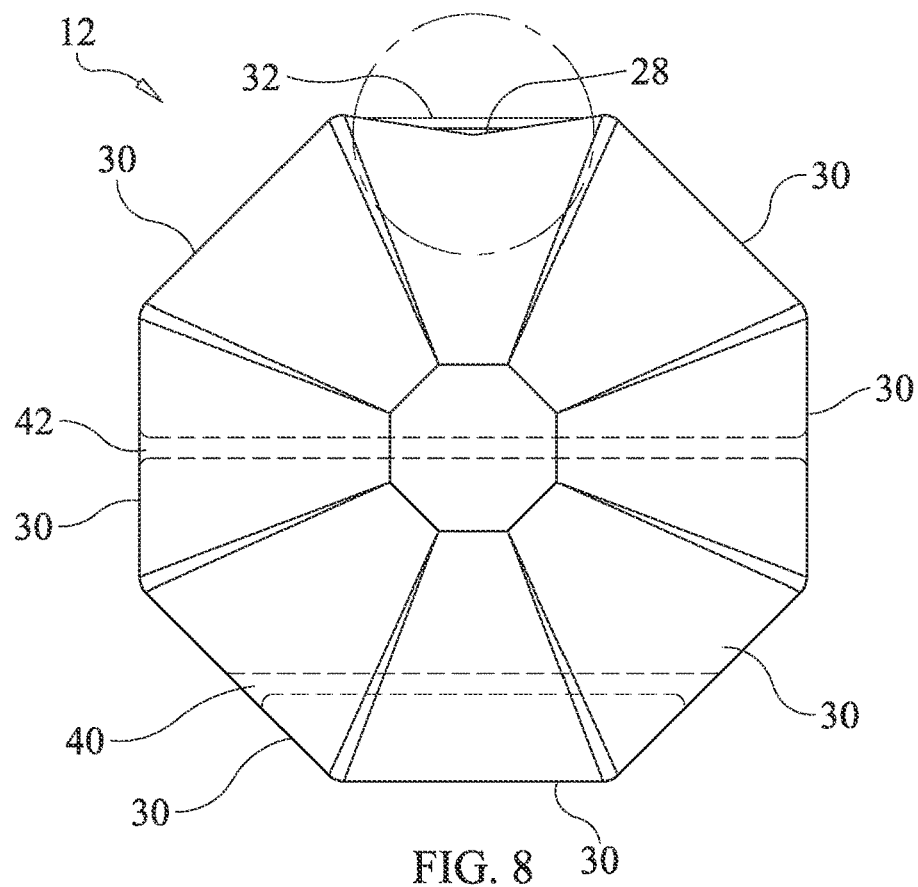
FIG. 8 is an end view of the buoyant device depicted in FIG. 5 showing the first end, the concaved area and one of projections within the concaved area in accordance with the first embodiment.
Figure 9:
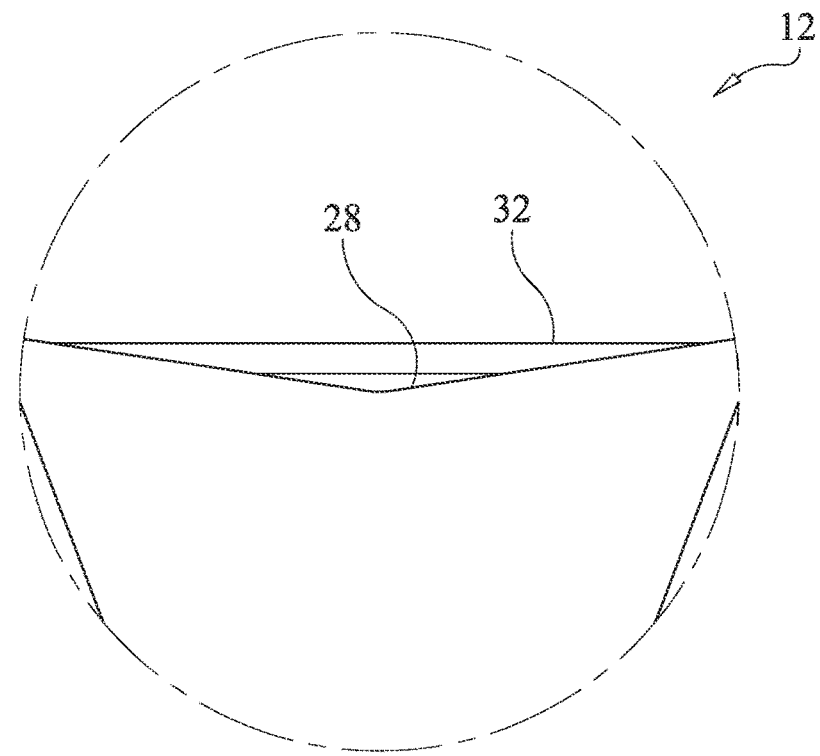
FIG. 9 is an enlarged end view of the buoyant device depicted in FIG. 8 showing only the concaved area and one of projections within the concaved area in accordance with the first embodiment.
Figure 10:
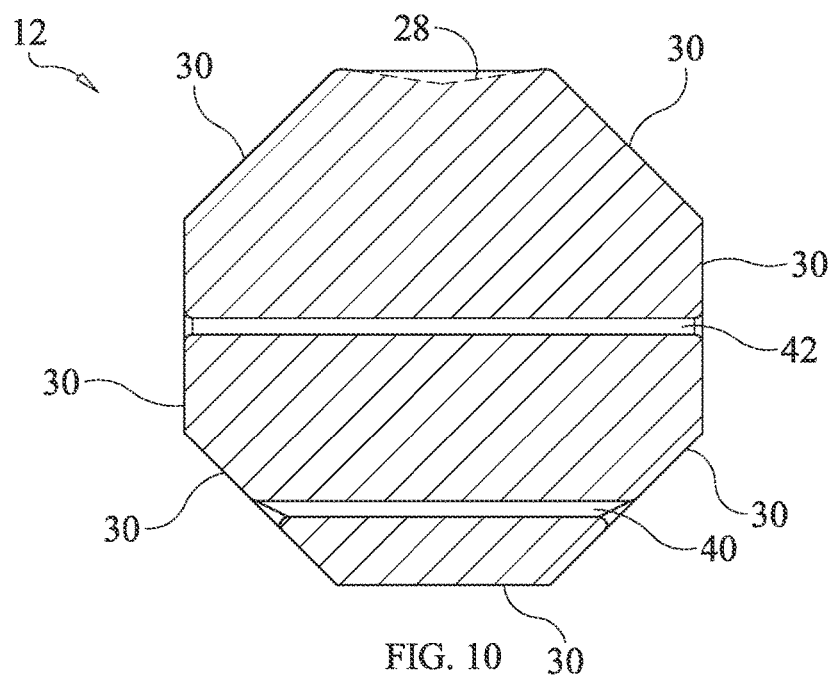
FIG. 10 is a cross-sectional view of the buoyant device taken along the line 10-10 in FIG. 7 showing the first and second strap receiving tunnels that extend through the buoyant device in accordance with the first embodiment.

As shown in FIGS. 5-12, the buoyant device 12 has an outer surface 20 with a first end portion 22, a second end portion 24 and an elongated portion 26, The elongated portion 26 extends from the first end portion 22 to the second end portion 24. The elongated portion 26 has an overall shape that resembles a cylinder when viewed from a distance. The cylinder shape is interrupted by a concaved section 28. In the first embodiment, the resemblance to a cylinder of the elongated portion 26 is achieved with the outer surface 20 having an octagonal shape with eight sections including seven flat sections 30, as shown in FIGS. 8 and 10. The last section of the eight sections that define the outer surface 20 in the first embodiment is the concaved section 28.

The first end portion 22 and the second end portion 24 of the outer surface 20 of the buoyant device 12 has an overall semi-spherical shape, as viewed from a distance. However, like the elongated portion 26, each of the first and second end portions 22 and 24 include eight separate sections that curve inward to define the overall semi-spherical shape.

The concaved section 28 defines a shape that complements the outer radius $R_1$ (the pipe radius) of the pipe 14. Consequently, with the concaved section 28 being strapped in place against the outer surface of the pipe 14, the buoyant device 12 can attach to the pipe 14 without rotating with respect to the pipe 14.

Figure 5:
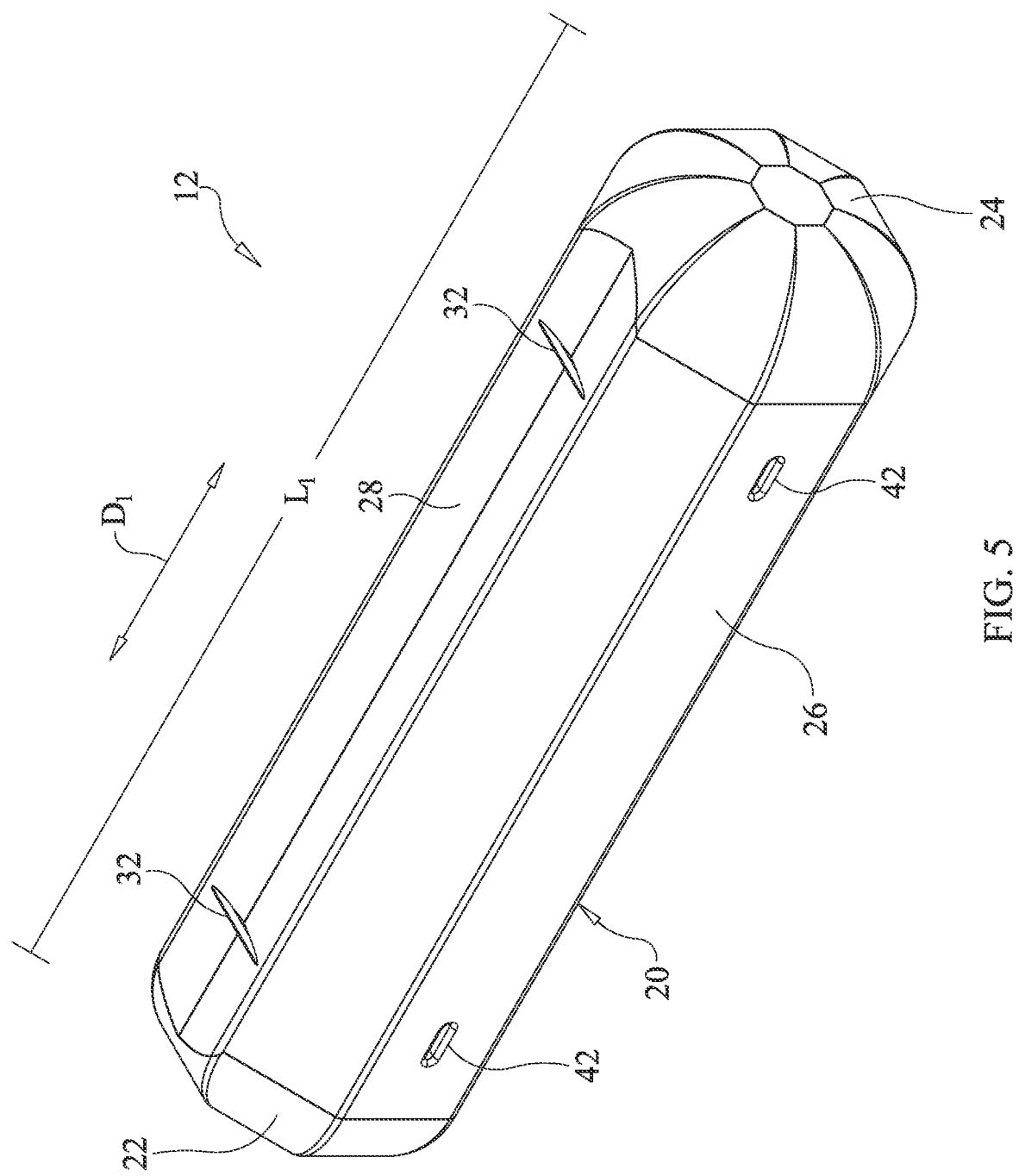
FIG. 5 is a perspective view of one of the buoyant devices showing an outer surface with a first end, a second end and an elongated portion that includes a concaved area and a pair of projections within the concaved area in accordance with the first embodiment.

The buoyant device 12 has an overall length $L_1$ measured in a lengthwise direction $D_1$ of the buoyant device 12, as shown in FIGS. 5 and 6. The concaved section 28 includes at least one protrusion 32 and preferably two protrusions 32 that are dimensioned and shaped to contact the pipe 14 preventing longitudinal movement therebetween with the buoyant device 12 strapped to the pipe 14. Both of the protrusions 32 extend in directions perpendicular to the lengthwise direction $D_1$ of the buoyant device 12, as shown in FIG. 6.

Figure 11:
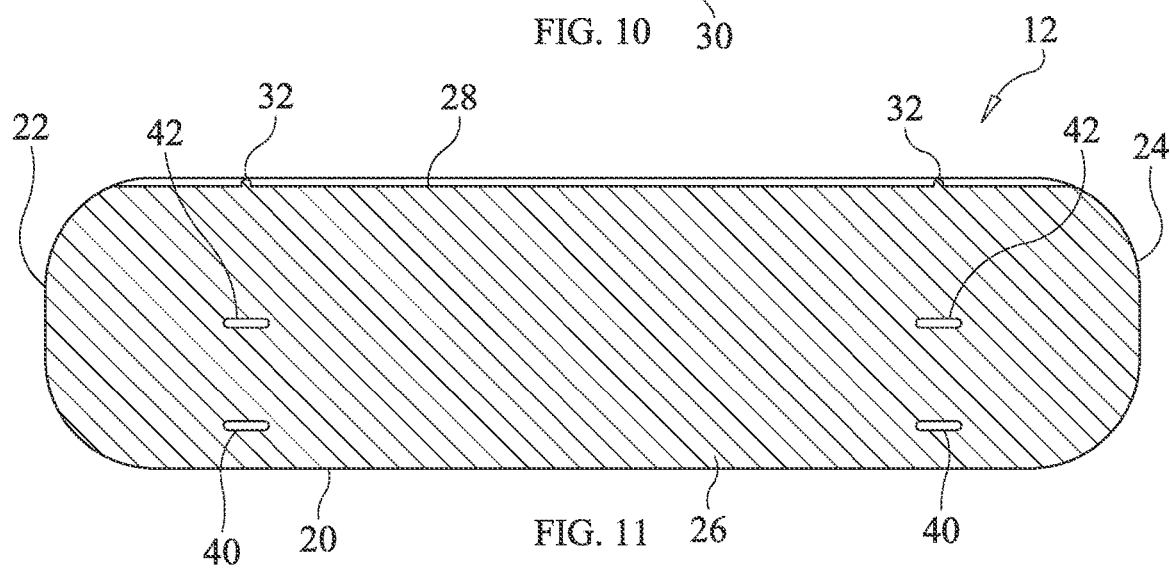
FIG. 11 is a cross-sectional view of the buoyant device taken along the line 11-11 in FIG. 6 showing the first and second strap receiving tunnels, the concaved area and the pair of projections within the concaved area in accordance with the first embodiment.
Figure 12:
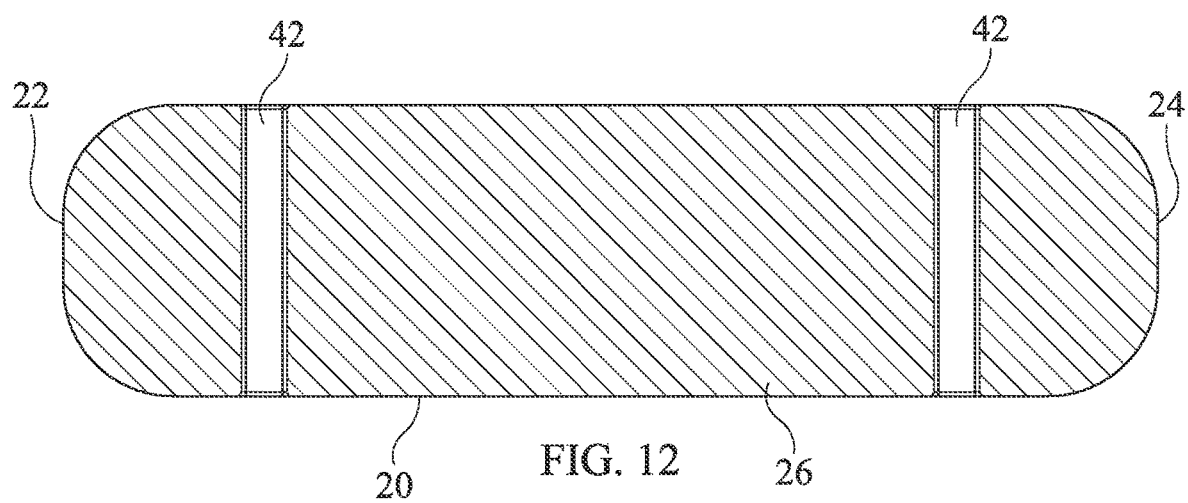
FIG. 12 is a cross-sectional view of the buoyant device taken along the line 12-12 in FIG. 7 showing the second strap receiving tunnels that extend through the buoyant device in accordance with the first embodiment.
Figure 13:
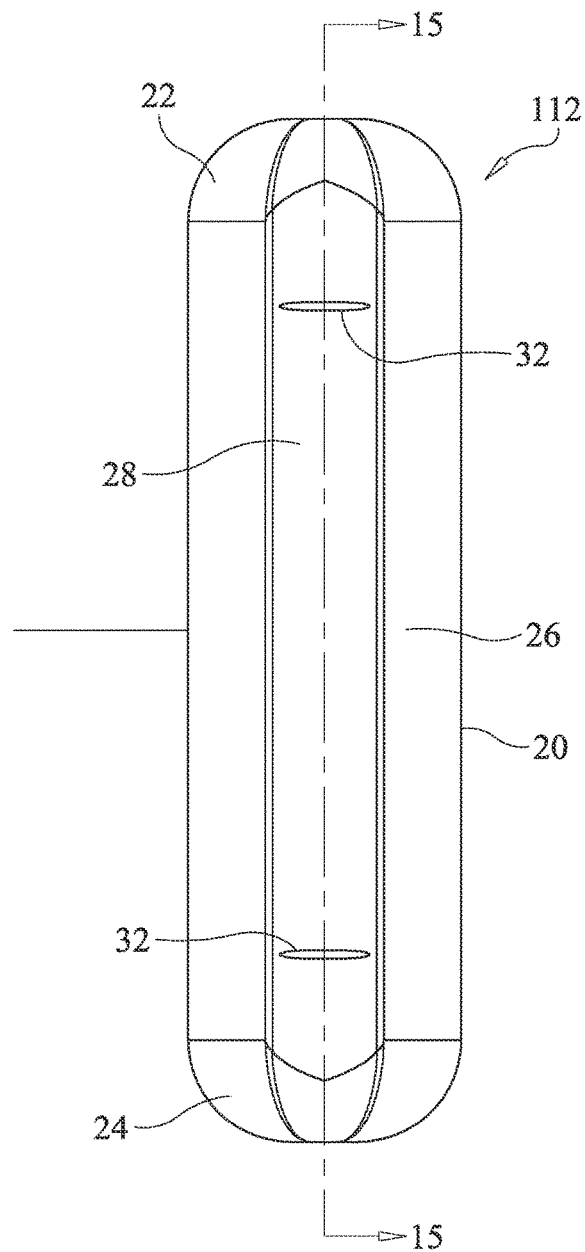
FIG. 13 is a first side view of a buoyant device showing the outer surface, the first end, the second end, the elongated portion, the concaved area and the pair of projections within the concaved area in accordance with a second embodiment.
Figure 14:
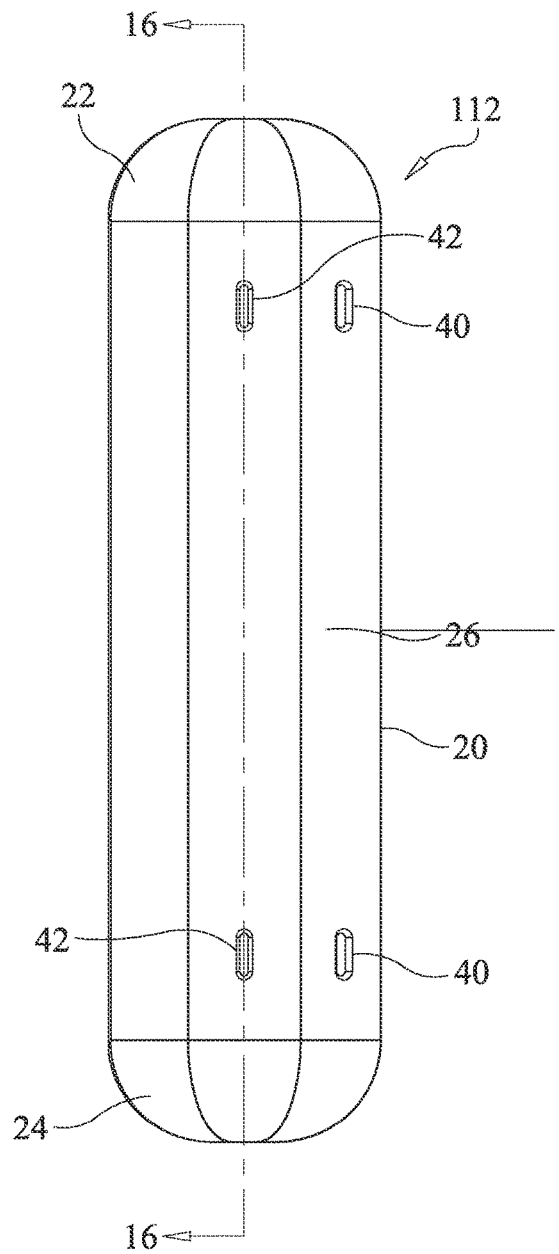
FIG. 14 is a second side view of the buoyant device depicted in FIG. 13 showing the outer surface, the first end, the second end, and first and second strap receiving tunnels in accordance with the second embodiment.
Figures 15, 16:
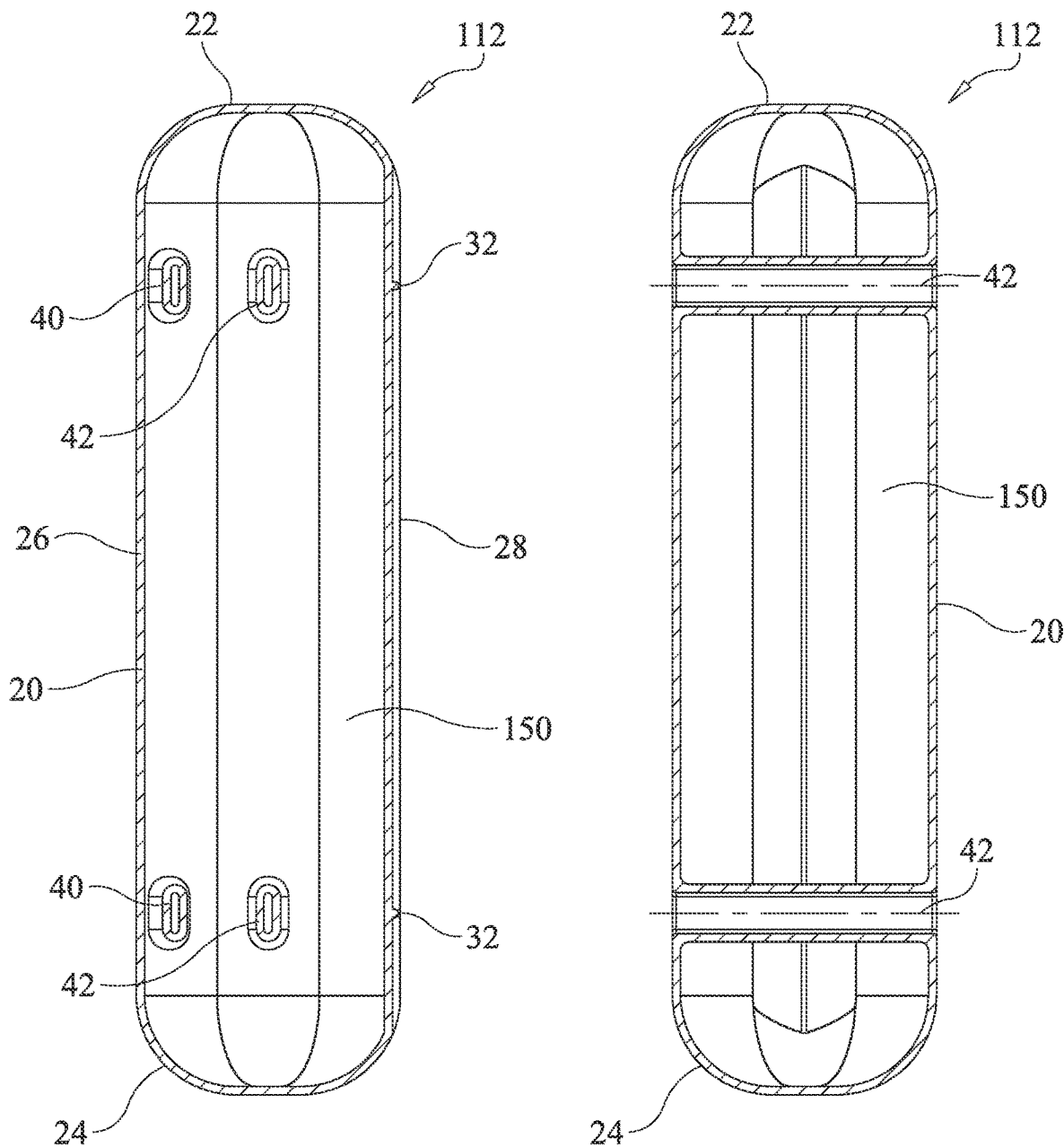
FIG. 15 is a cross-sectional view of the buoyant device taken along the line 15-15 in FIG. 13 showing a hollow interior of the buoyant device, the first and second strap receiving tunnels, the concaved area and the pair of projections within the concaved area in accordance with the second embodiment.
FIG. 16 is a cross-sectional view of the buoyant device taken along the line 16-16 in FIG. 14 showing the hollow interior of the buoyant device and the second strap receiving tunnels that extend through the buoyant device in accordance with the second embodiment.

As shown in FIGS. 10-12, the buoyant device 12 is not hollow in the first embodiment. Rather, the buoyant device 12 is filled with a foam material, such as, for example, expandable polyurethane, polystyrene or other light weight material that ensures buoyancy of the buoyant device 12. The outer surface 20 of the buoyant device 12 is defined an outer wall of the buoyant device 12. The outer wall can be formed from metallic materials or by any of a variety of plastic or polymers materials suitable for use in marine environments.

As shown in FIGS. 4-5, 7-8 and 10-12, the buoyant device 12 includes a pair of first strap receiving tunnels 40 and a pair of second strap receiving tunnels 42. The first strap receiving tunnels 40 extend between flat sections 30 located proximate an opposite side of the buoyant device 12 from the concaved section 28. The first strap receiving tunnels 40 are parallel to one another and parallel to the projections 32.

The pair of second strap receiving tunnels 42 extend through the buoyant device 12 and are centered with respect thereto, as shown in cross-section in FIGS. 8 and 10. The second strap receiving tunnels 42 are parallel to the first strap receiving tunnels 40 and spaced apart therefrom.

As shown in FIGS. 3 and 4, the straps 16 and 18 are installed to the buoyant devices 12 such that the strap 16 extends through one of the first strap receiving tunnels 40 in each of the plurality of buoyant devices 12 and the strap 18 extends through the other of the first strap receiving tunnels 40 in each of the plurality of buoyant devices 12. The plurality of buoyant devices 12 are tightened to the pipe 14 such that the straps 16 and 18 press the projections 32 onto the outer surface of the pipe 14. The straps 16 and 18 are then tightened. Once the straps 16 and 18 are tightened, contact between the projections 32 and the pipe 14 ensure that the plurality of buoyant devices 12 to not move in the lengthwise direction $D_1$ relative to the pipe 14. Further, since the pipe 14 extends into each of the concaved sections 28 of the buoyant devices 12, the straps 16 and 18 prevent rotation of the buoyant devices 12 relative to each other. As well, the straps 16 and 18 extending through the first strap receiving tunnels 40 further wrap around all of the buoyant devices 12 holding them together and in place about the pipe 14.

The second strap receiving tunnels 42 can be used in applications where fewer numbers of buoyant devices 12 are used, as is shown in the embodiments depicted in FIGS. 25-28 and described in greater detail below.

Second Embodiment

Referring now to FIGS. 13-16, a buoyant device 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The buoyant device 112 is basically the same (from the outside) as the buoyant device 12 of the first embodiment, except that the buoyant device 112 has a hollow interior 150. More specifically, the buoyant device 112 includes the outer surface 20 with the first end 22, the second end 24, the elongated portion 26, the concaved section 28 and the projections 32. The buoyant device 112 further includes the first strap receiving tunnels 40 and the second strap receiving tunnels 42, as described above with respect to the first embodiment. In the first embodiment, the buoyant device 12 is not hollow. In the second embodiment, the buoyant device 112 is hollow.

Third Embodiment

Figure 17:
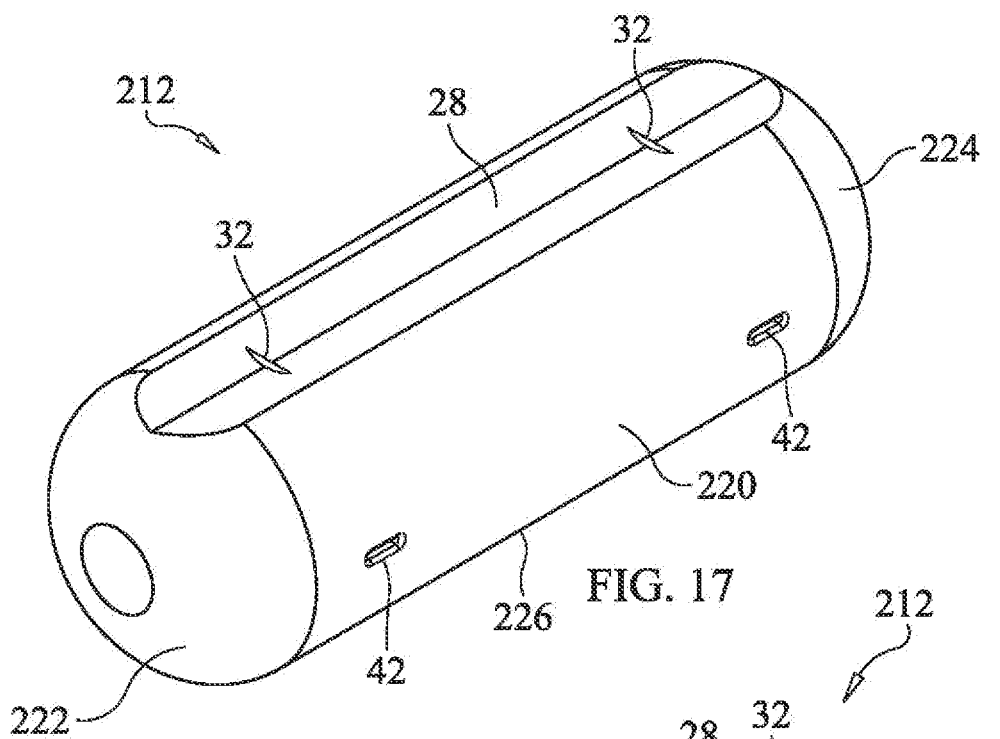
FIG. 17 is a perspective view of a buoyant device having an overall smooth surface in accordance with a third embodiment.
Figure 18:
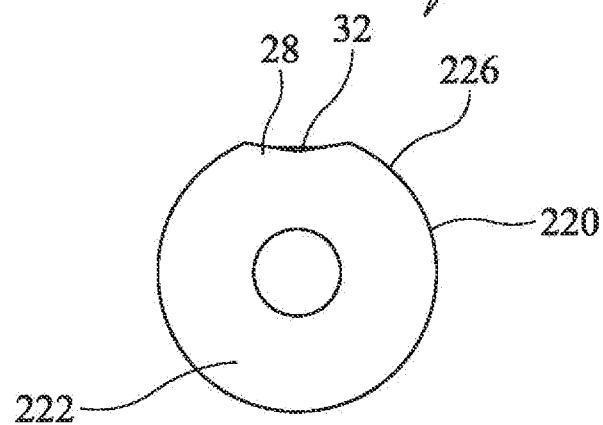
FIG. 18 is an end view of the buoyant device having the overall smooth surface in accordance with the third embodiment.
Figure 19:
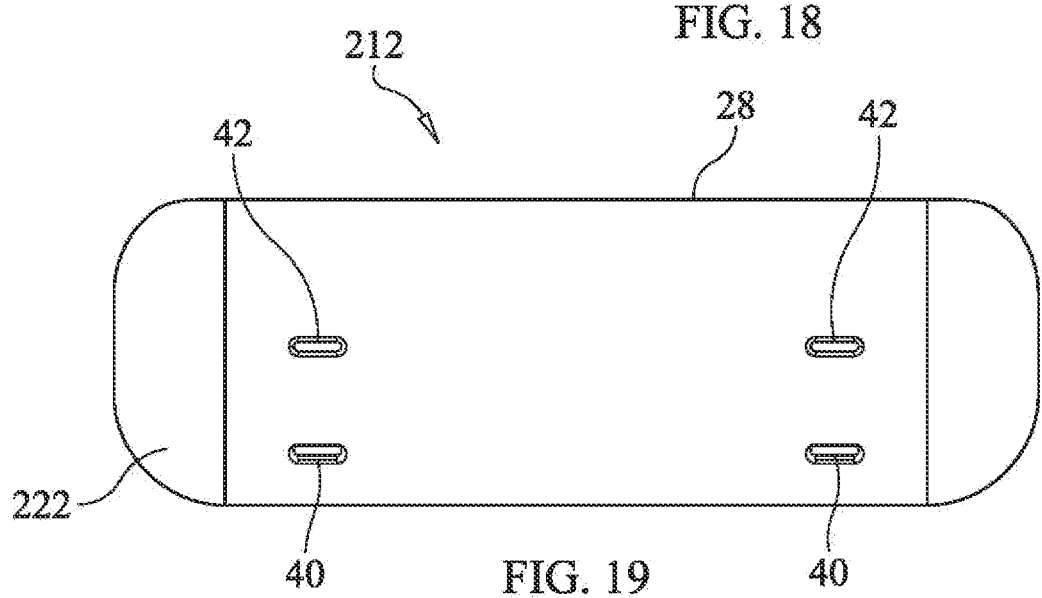
FIG. 19 is a side view of the buoyant device having the overall smooth surface in accordance with the third embodiment.

Referring now to FIGS. 17-19, a buoyant device 212 in accordance with a third embodiment will now be explained.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The buoyant device 212 is very similar to the buoyant device 12 of the first embodiment, except that the buoyant device 212 has a smooth outer surface 220. The buoyant device 212 includes an outer surface 220 with a first end 222, a second end 224 and an elongated portion 226. The outer surface 220 is dimensioned and shaped in a manner similar to the outer surface 20 of the first embodiment, except that the outer surface 220 is smooth and continuous except for the inclusion of the concaved section 28 and the projections 32. The concaved section 28 and the projections 32 are as described in the first embodiment. Similarly, the first end 222 has an overall shape similar to the first end 22 but is smooth. As well, the second end 224 has an overall shape similar to the second end 22 of the first embodiment but is smooth.

The buoyant device 212 further includes the first strap receiving tunnels 40 and the second strap receiving tunnels 42.

Fourth Embodiment

Referring now to FIGS. 20-24, a buoyant device 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The buoyant device 312 of the fourth embodiment has some features common with the first embodiment. However, in the fourth embodiment, the buoyant device 312 has an outer surface 320 that includes a first end 322, a second end 324 and an elongated portion 326. The buoyant device 312 further includes the concaved section 28 and the projections 32 of the first embodiment. The buoyant device 312 further includes at least one the first strap receiving tunnels 40 and at least one of the second strap receiving tunnels 42, as described in the first embodiment.

Figure 20:
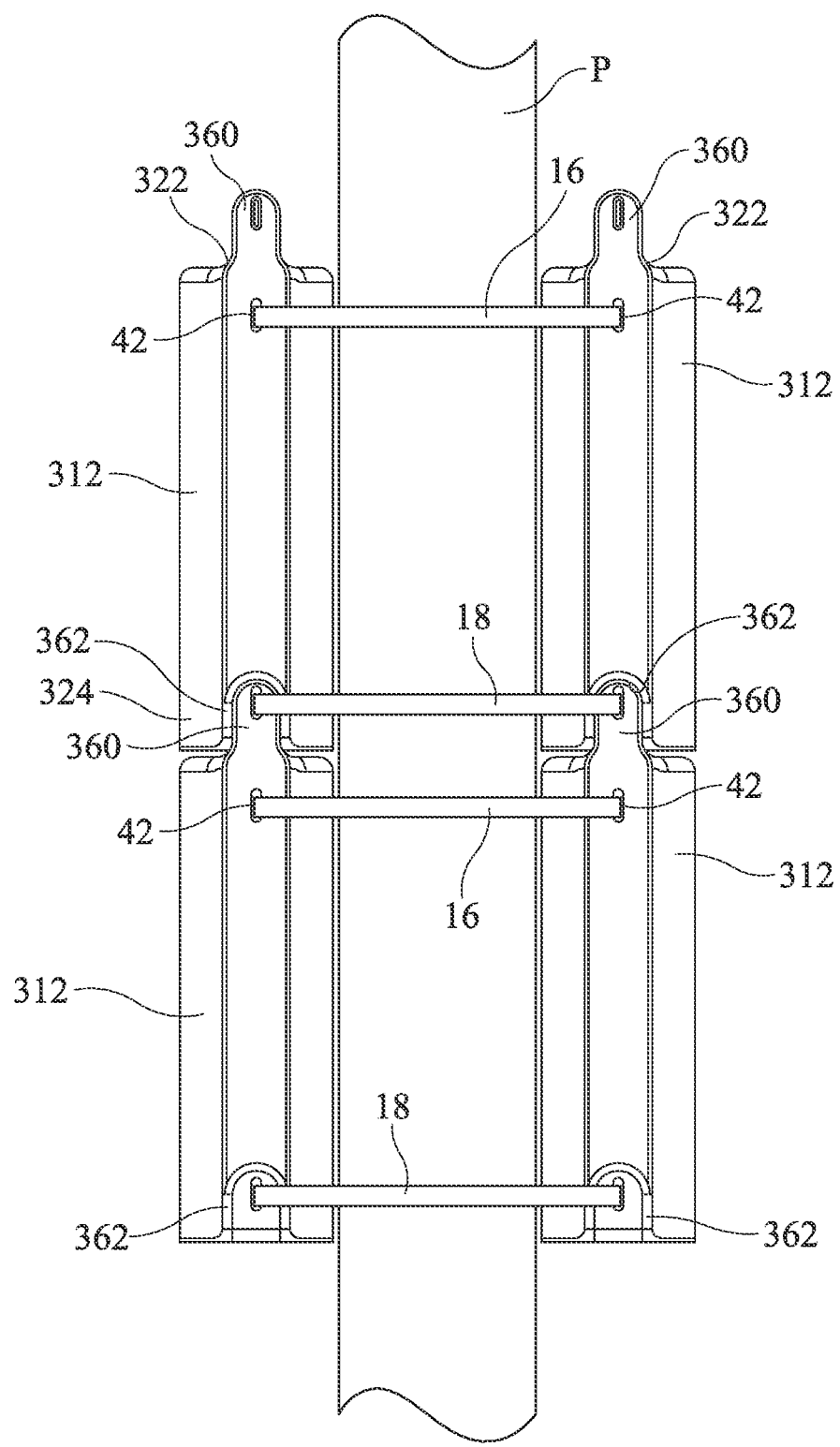
FIG. 20 is a side view of a slurry pipe and a plurality of buoyant devices attached to the slurry pipe in accordance with a fourth embodiment.
Figure 21:
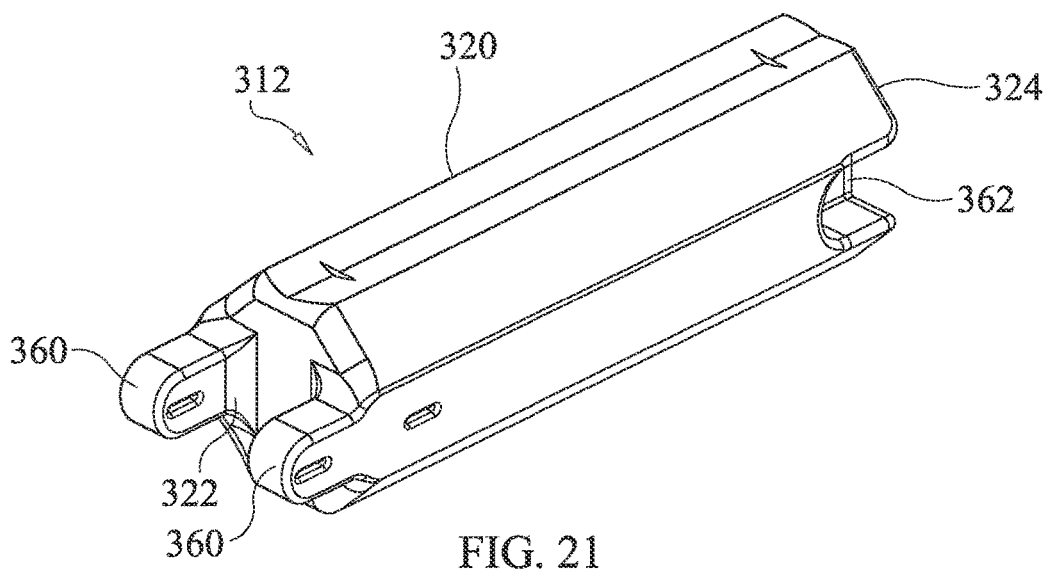
FIG. 21 is a perspective view of one of the buoyant devices depicted in FIG. 20 showing a pair of attachment projections at a first end thereof and a pair of recesses at a second end thereof in accordance with the fourth embodiment.
Figure 22:
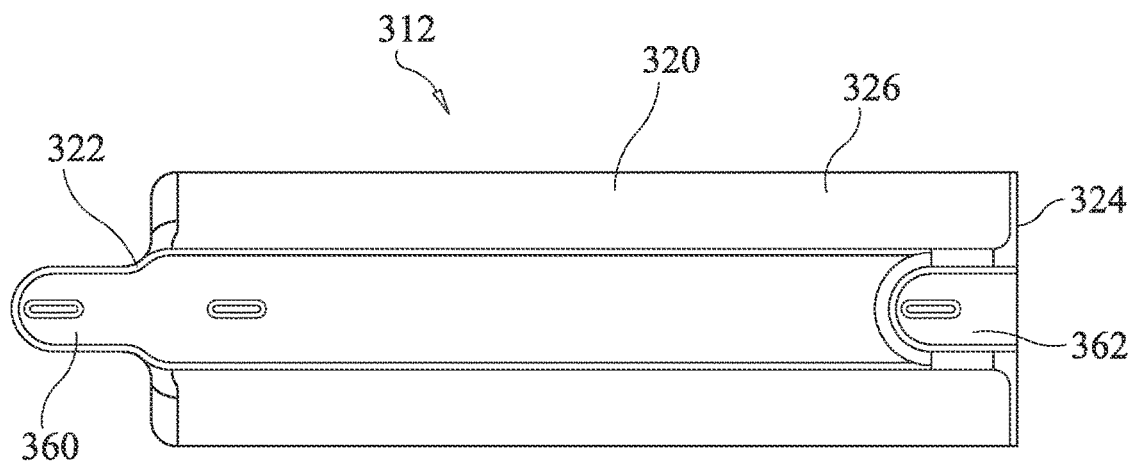
FIG. 22 is a side view of the buoyant device depicted in FIG. 21 showing the pair of attachment projections and the pair of recesses in accordance with the fourth embodiment.
Figure 23:
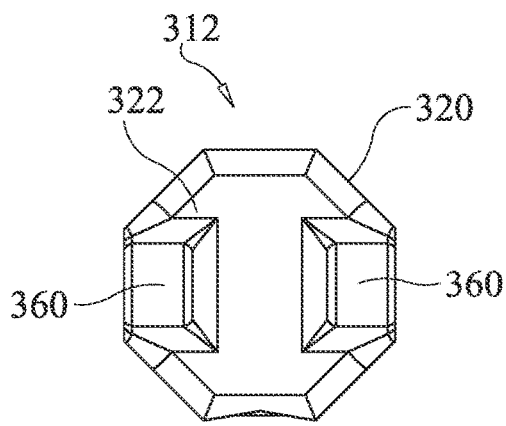
FIG. 23 is a first end view of the buoyant device depicted in FIGS. 21 and 21 showing the projections in accordance with the fourth embodiment.
Figure 24:
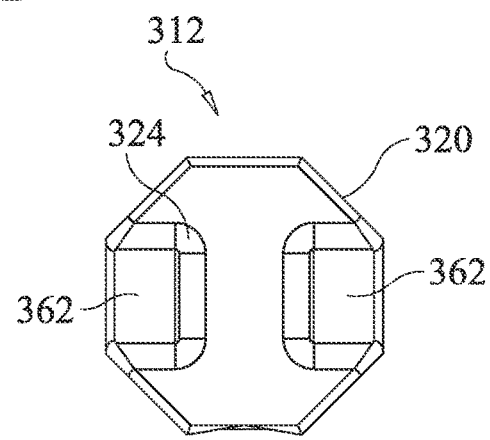
FIG. 24 is a second end view of the buoyant device depicted in FIGS. 20-2.3 showing the recesses in accordance with the fourth embodiment.

The first end 322 includes a pair of attachment projections 360 that extend from the elongated portion 326. The second end 324 includes a pair of recesses 362 that are shaped and dimensioned to receive the pair of attachment projections 360. As shown in FIG. 20, the second end 324 of the buoyant device 312 can be attached to the first end 322 of a second of the buoyant device 312 via a pair of attachment projections 360 of the second of the buoyant devices 312 being inserted into the pair of recesses 362 at the second end of the first of the buoyant device 312. The strap 16 is inserted the second strap receiving tunnels 42 and the strap 18 is fitted into openings of the projections 360 and thereafter into openings (equivalent to another strap receiving tunnel) in the recesses 362 fixing the two of the buoyant devices 312 together.

Thus a plurality of the buoyant devices 312 can be attached about the outer surface of the pipe 14, and at least pairs of buoyant devices 312 can be attached to one another end to end. It should be understood that many buoyant devices 312 can be attached to one another end to end depending on the length of the pipe 14 and the buoyancy requirements of the slurry transporting riser assembly 10.

Fifth Embodiment

Figure 25:
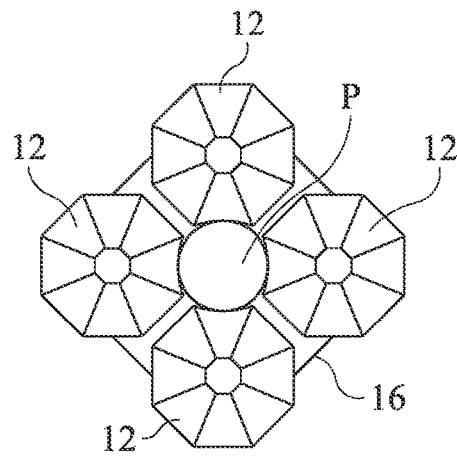
FIG. 25 is an end view of a slurry pipe with four of the buoyant devices strapped thereto in accordance with a fifth embodiment.

Referring now to FIG. 25, a slurry transporting riser assembly in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, a plurality of the buoyant devices 12 are installed about the pipe 14. The diameter of the pipe 14 and the dimensions of the buoyant devices 12 can, in certain circumstances, be used determine how many buoyant devices 12 are needed. In the fifth embodiment, four of the buoyant devices 12 are strapped about the pipe 14 with straps 16 being installed in the strap receiving tunnels 42, as shown in FIG. 25.

Sixth Embodiment

Figure 26:
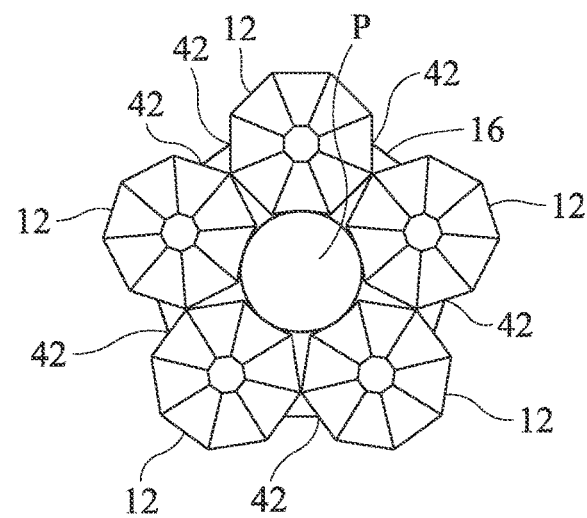
FIG. 26 is an end view of a slurry pipe with five of the buoyant devices strapped thereto in accordance with a sixth embodiment.

Referring now to FIGS. 26, a slurry transporting riser assembly in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, a plurality of the buoyant devices 12 are installed about the pipe 14. In the sixth embodiment, five of the buoyant devices 12 are strapped about the pipe 14 with straps 16 being installed in the strap receiving tunnels 42, as shown in FIG. 26.

Seventh Embodiment

Figure 27:
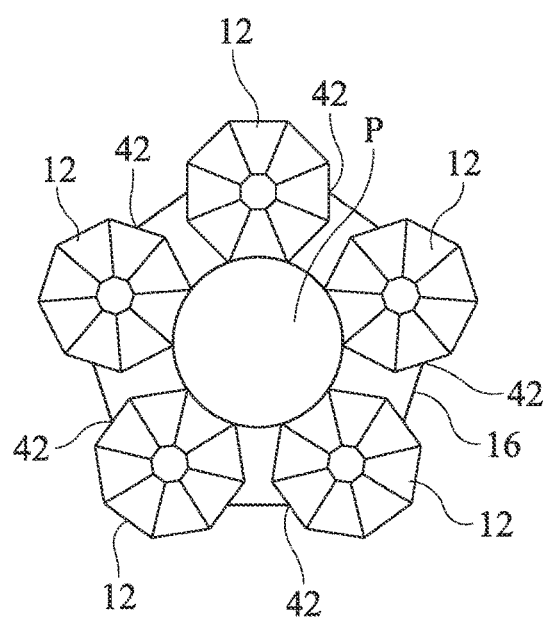
FIG. 27 is an end view of a slurry pipe with five of the buoyant devices strapped thereto in accordance with a seventh embodiment.

Referring now to FIG. 27, a slurry transporting riser assembly in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the relative diameter of the pipe 14 is larger than in the sixth embodiments. A plurality of the buoyant devices 12 are installed about the pipe 14. In the seventh embodiment, five of the buoyant devices 12 are again strapped about the pipe 14 with straps 16 being installed in the strap receiving tunnels 42, as shown in FIG. 26. Alternatively, the straps 16 can be installed in the strap receiving tunnels 40 (not shown in FIG. 27).

Eighth Embodiment

Figure 28:
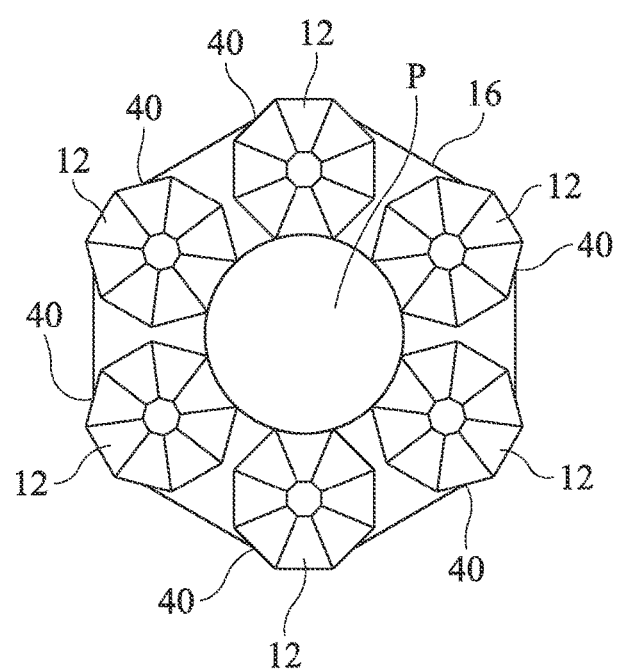
FIG. 28 is an end view of a slurry pipe with six of the buoyant devices strapped thereto in accordance with an eighth embodiment.

Referring now to FIG. 28, a slurry transporting riser assembly in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the relative diameter of the pipe 14 is larger than in the sixth and seventh embodiments. A plurality of the buoyant devices 12 are installed about the pipe 14. In the eighth embodiment, six of the buoyant devices 12 are strapped about the pipe 14 with straps 16 being installed in the strap receiving tunnels 40, as shown in FIG. 28.

Ninth Embodiment

Referring now to FIGS. 29-34, a buoyant device 412 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

Figure 29:
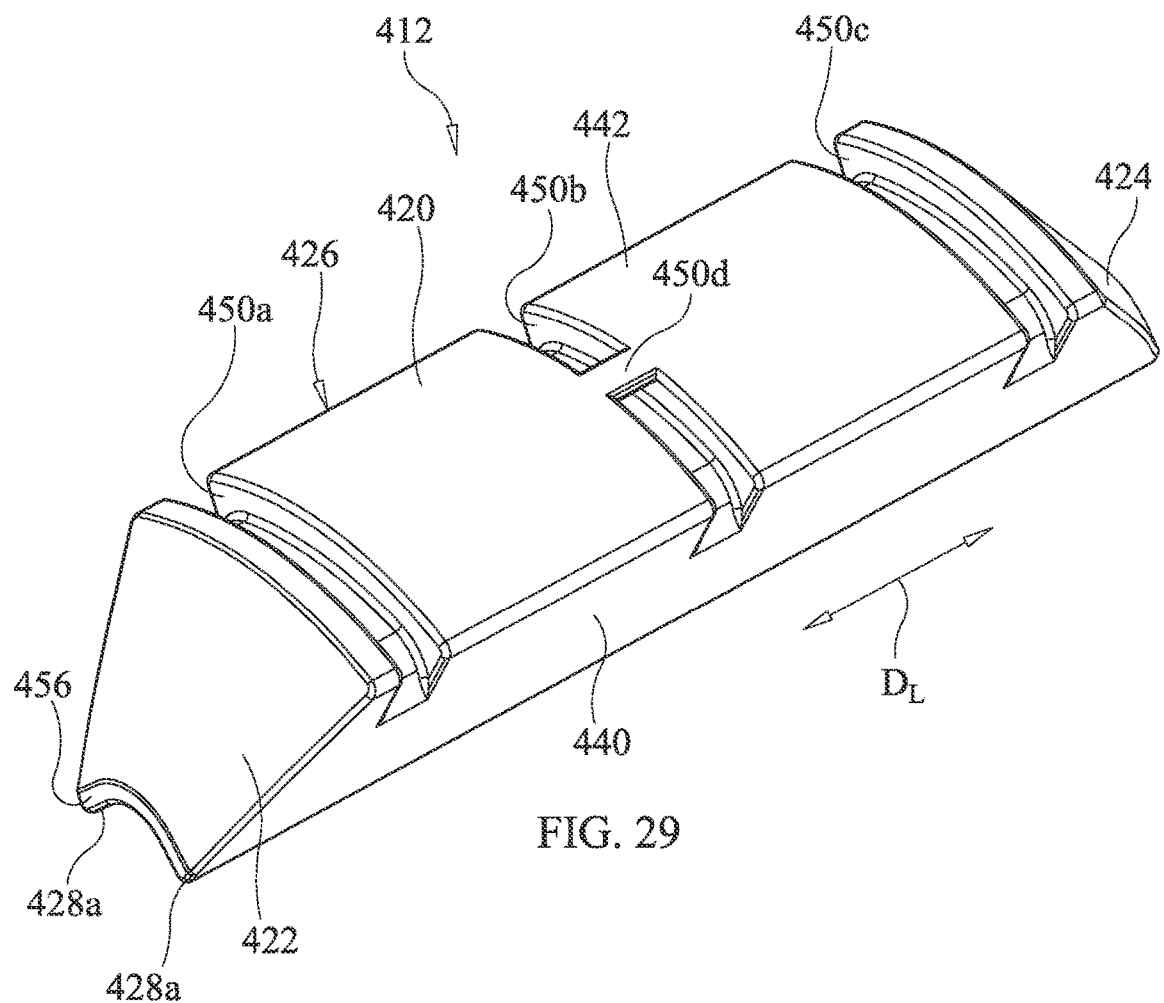
FIG. 29 is a perspective view of a buoyant device in accordance with a ninth embodiment.

The buoyant device 412 in the ninth embodiment has an outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 29.

Figure 32:
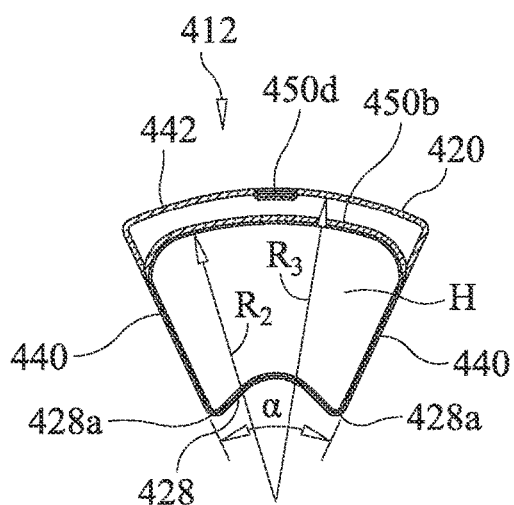
FIG. 32 is a cross-sectional view of the buoyant device taken along the line 32-32 in FIG. 31 in accordance with the ninth embodiment.
Figure 33:
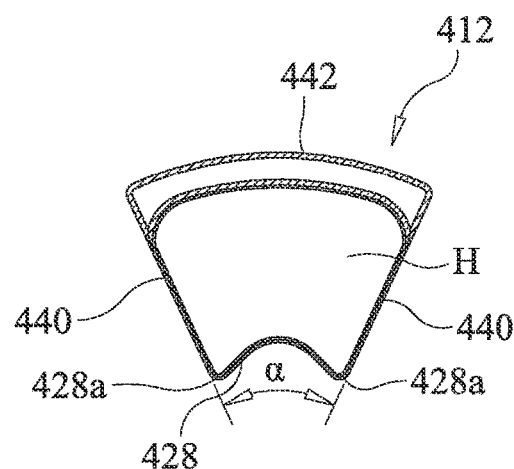
FIG. 33 is another cross-sectional view of the buoyant device taken along the line 33-33 in FIG. 31 in accordance with the ninth embodiment.
Figure 34:
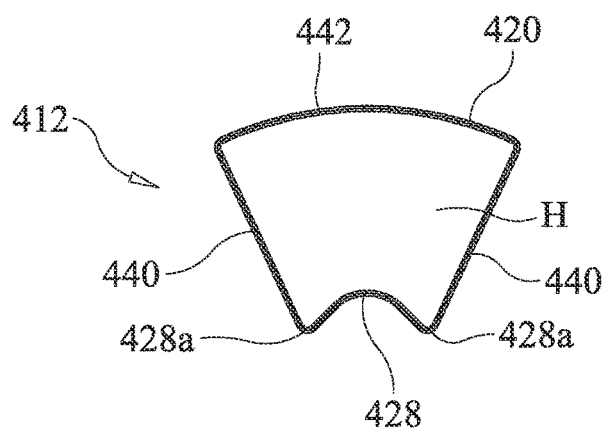
FIG. 34 is yet another cross-sectional view of the buoyant device taken along the line 34-34 in FIG. 31 in accordance with the ninth embodiment.

The elongated portion 426 extends from the first end portion 422 to the second end portion 424. The elongated portion 426 has an overall shape that resembles a wedge or a piece of pie with a bite taken out of an inner end thereof, as viewed from either end thereof or in cross-section, as shown in FIGS. 32, 33 and 34. Put another way, the first end portion 422 and the second end portion 424 of the outer surface 420 of the buoyant device 412 has wedge-like shape, as viewed in perspective. An inner area of the buoyant device 412 defines a concaved section 428 that is curved when viewed from either end, as shown in FIGS. 32-34. The first end portion 422 and the second end portion 424 of the outer surface 420 are also tapering surfaces, as viewed from the perspective, top and side views as in FIGS. 29, 30 and 31, respectively.

The concaved section 428 extends from the first end portion 422 to the second end portion 424. The concaved section 428 has edges 428a that define a shape that complements an outer radius of the slurry pipe 14 with the buoyant device 428 attached to the slurry pipe 14, as described below.

The outer surface 420 of the elongated portion 426 has opposing side surface sections 440, a convex section 442 and the concaved section 428. The side surface sections 440 are generally flat or planar, as shown in FIGS. 29 and 32-34. Each side sections 440 extend from a corresponding edge 428a of the concaved section 428 to a corresponding edge of the convex section 442. The convex section 442 extends parallel to the concaved section 428. The side sections 440 are angularly offset from one another defining an acute angle $\alpha$, therebetween, as shown in FIG. 33. The acute angle $\alpha$, can have any of a variety of values, depending upon the desired shape and purpose of the buoyant device 412. In the depicted embodiment the acute angle $\alpha$ is between 45 and 55 degrees but is preferably approximately 50 (plus or minus one) degrees.

The buoyant device 412 is shaped and configured to attach to the slurry pipe 14 with edges 428a of the concaved section 428 contacting the slurry pipe 14 as is shown in FIGS. 37-38, 40-41, 43-44 and 46-47, and described further below.

The concaved section 428 defines a part-cylindrical or curved shape that complements or is smaller than the outer radius $R_1$ (the pipe radius) of the pipe 14 (FIGS. 1 and 3). Consequently, with the buoyant device 412 being strapped in place against the outer surface of the slurry pipe 14, the edges 428a of the concaved section 428 of the buoyant device 12 can press against the pipe 14 (for larger pipes 14) assisting in preventing rotating or movement along and with respect to the pipe 14. For smaller diameter pipes, tightening a strap $S_1$ (described below) can be sufficient to retain the buoyant device(s) 412 to the pipe 14, as described further below.

The convex section 442 extends from the first end section 422 to the second end portion 424 but is interrupted by at least one strap receiving recess 450a. Preferably, convex section 442 includes three strap receiving recesses 450a, 450b and 450c. Each of the strap receiving recesses 450a, 450b and 450c extends in a direction $D_1$ or parallel to the direction $D_1$ that perpendicular to a lengthwise direction $D_L$ of the convex section 442 and the buoyant device 412. A bottom surface of each of the strap receiving recesses 450a, 450b and 450c has an arcuate shape that has a radius $R_2$ smaller that a radius $R_3$ defined by the curvature of the convex section 442, as shown in FIG. 32. The strap receiving recesses 450a and 450c are identical in shape and dimensions. The strap receiving recess 450b is identical to the recesses 450a and 450b except that a central area of the recess 450b includes a bridge portion 450d that covers a small portion of the recess 450b defining a tunnel within the recess 450b, as shown in FIGS. 29, 30, 31 and 32. When a strap $S_1$ is inserted into the recess 450b, the strap $S_1$ is more readily retained within the recess 450b by the bridge portion 450d thereby making attachment of the buoyant device 12 to the pipe 14.

Figure 30:
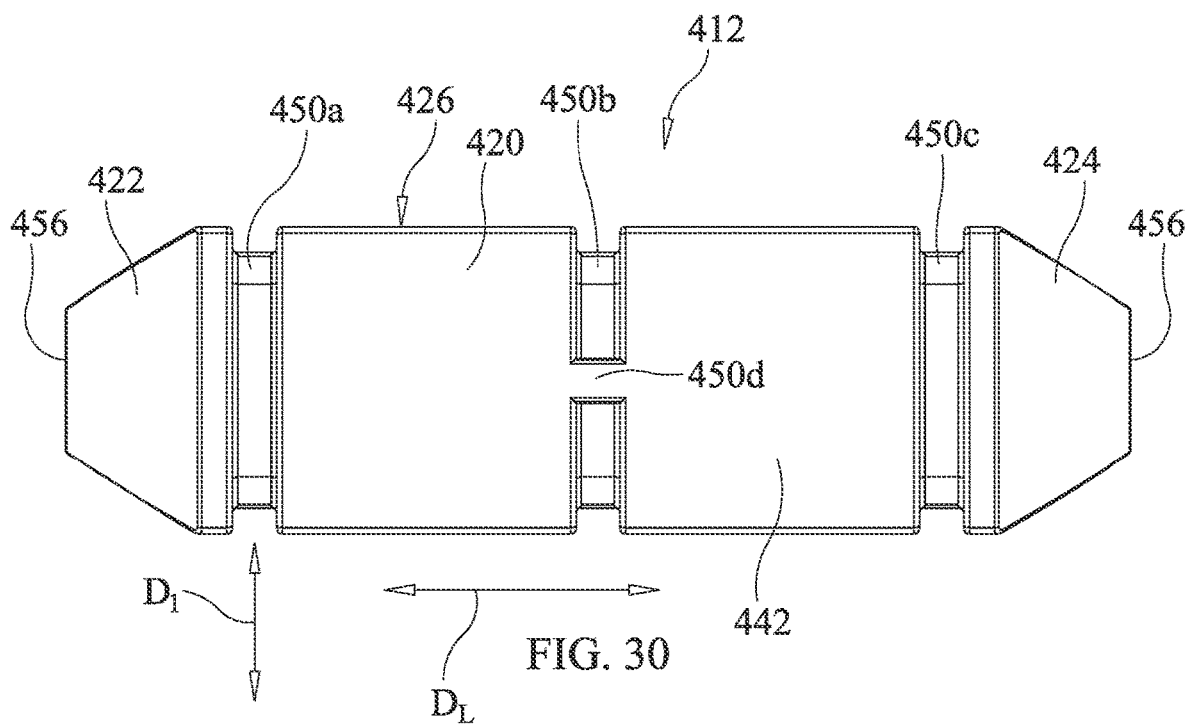
FIG. 30 is a top view of the buoyant device depicted in FIG. 29 in accordance with the ninth embodiment.
Figure 31:
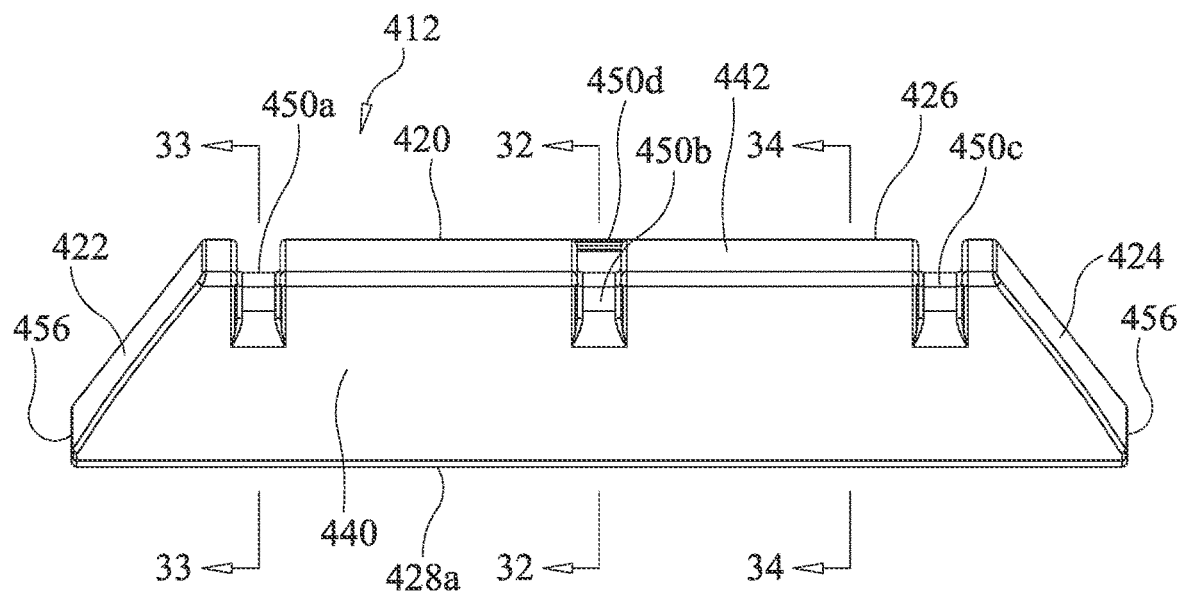
FIG. 31 is a side view of the buoyant device depicted in FIGS. 29-30 in accordance with the ninth embodiment.

As shown in FIGS. 29-31, each of the first end portion 422 and the second end portion 424 includes an arcuate shaped flat surface section 456. The arcuate shaped flat surface section 456 is provided for installations where buoyant devices 412 are installed end to end along the lengthwise direction $D_1$ of the pipe 14.

As is shown in FIGS. 32-34, the buoyant device 412 can have hollow interior H. The buoyant device 412 can be made of any of a variety of materials, such as metal, metal alloys, plastic or polymer materials and/or reinforced fiber materials such as fiberglass, or combinations thereof.

As shown in the installation configurations below in FIGS. 35-53, the buoyant device 412 can be installed to various sized slurry pipes having a variety of diameters (and radii). For example, with a large diameter slurry pipe 14, seven (7) or more buoyant devices 412 can be strapped to the slurry pipe 14 (also referred to as the pipe P). For slurry pipes having smaller diameters, one, two, three, four, five or six buoyant devices 412 can be strapped together around a slurry pipe, as described in greater detail below.

Figure 35:
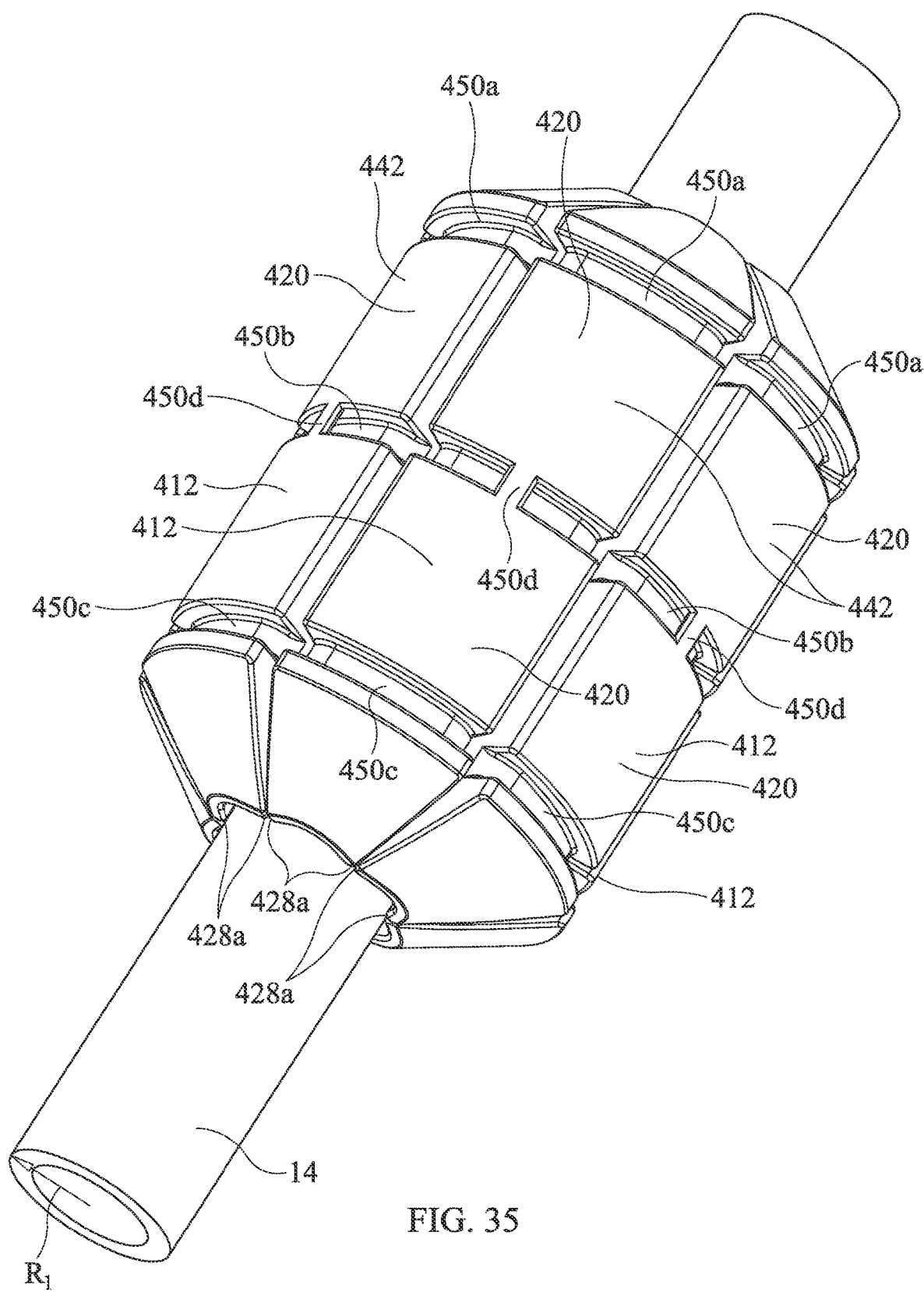
FIG. 35 is a perspective view of a slurry transporting riser assembly that includes seven of the buoyant devices placed around a slurry pipe prior to attachment to the slurry pipe in accordance with the ninth embodiment.
Figure 36:
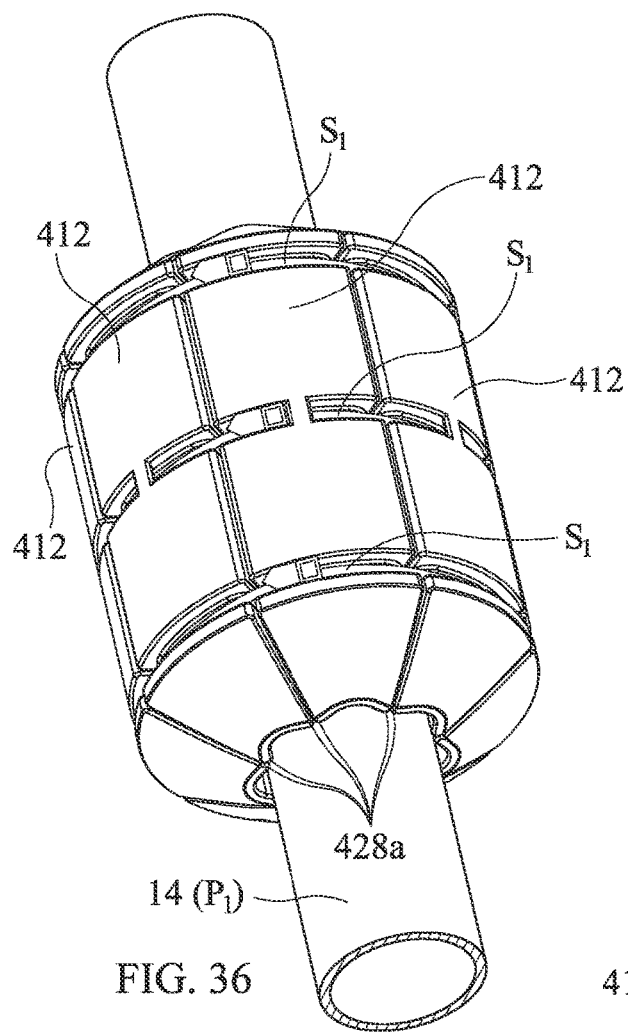
FIG. 36 is another perspective view of the slurry transporting riser assembly showing the seven buoyant devices strapped to and encircling the slurry pipe in accordance with the ninth embodiment.
Figure 37:
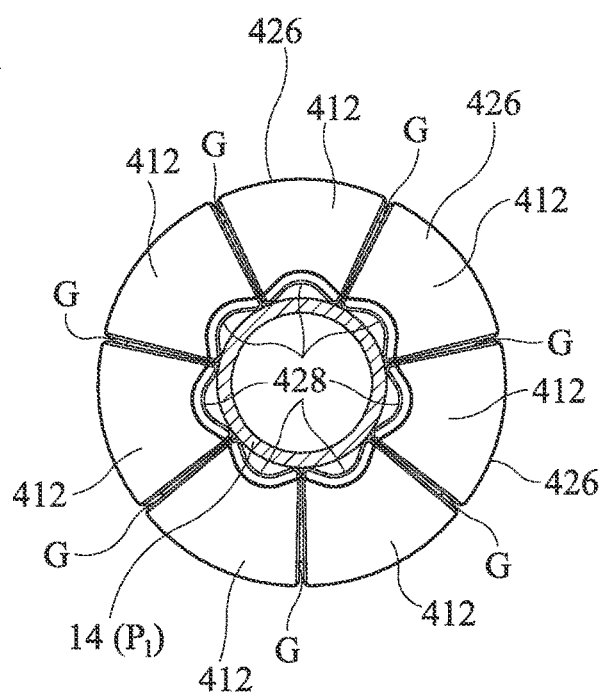
FIG. 37 is an end view of the slurry transporting riser assembly showing the seven buoyant devices strapped to and surrounding the slurry pipe showing small gaps between adjacent ones of the buoyant devices in accordance with the ninth embodiment.

As shown in FIG. 35, the slurry pipe 14 has a cylindrically shaped outer surface that defines the pipe radius $R_1$. A plurality of the buoyant devices 412 can be positioned around the pipe 14 for subsequent installation thereto. In the depicted embodiment, the pipe radius $R_1$ is such that seven of the buoyant devices 412 can be positioned around the pipe 14 with the buoyant devices 412 being slightly spaced apart from one another. In FIG. 36-37, the straps $S_1$ have been installed into the recesses 250a, 250b and 250c and tightened securing the buoyant devices 412 to the pipe 14 (also referred to as pipe $P_1$). As shown in FIG. 37, once tightened to the pipe Pt the seven buoyant devices 412 are slightly spaced apart from one another in a circumferential direction defining a plurality of gaps G therebetween.

As shown in FIG. 37, the concaved sections 428 of each the elongated portion 426 of the outer surface 420 of each buoyant device 412 is such that corresponding portions of the pipe Pt extends into the concaved sections 428.

Figure 38:
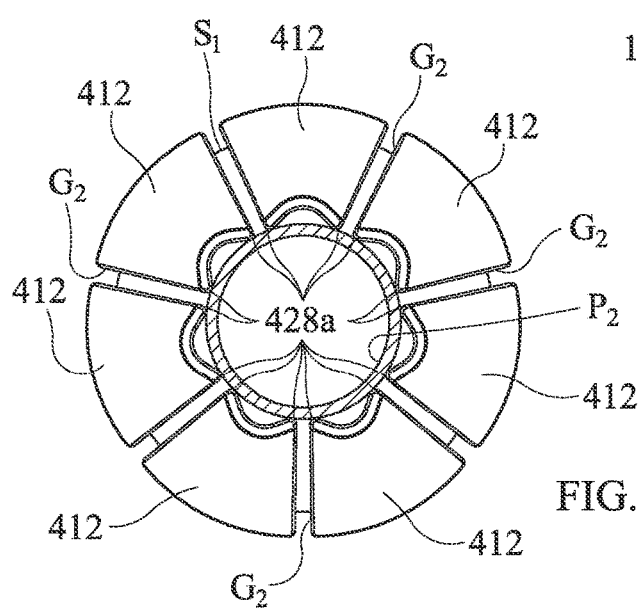
FIG. 38 is an end view of the slurry transporting riser assembly showing seven buoyant devices strapped to and surrounding a slurry pipe that is slightly larger than the slurry pipe shown in FIGS. 36 and 37 such that gaps are defined between adjacent ones of the buoyant devices, the gaps in FIG. 38 being slightly larger than the gaps shown in FIG. 37 in accordance with the ninth embodiment.

In FIG. 38, the plurality of buoyant devices 412 are secured to the outer surface of a pipe $P_2$ that has an outer radius (diameter) that slightly is larger than the radius of the pipe $P_1$. Consequently, the gaps $G_2$ are larger than the gaps G of the assembly of buoyant devices 412 shown in FIG. 37. Further, the adjacent surfaces of the buoyant devices 412 along the gaps G and $G_2$ are approximately parallel to one another.

Figure 39:
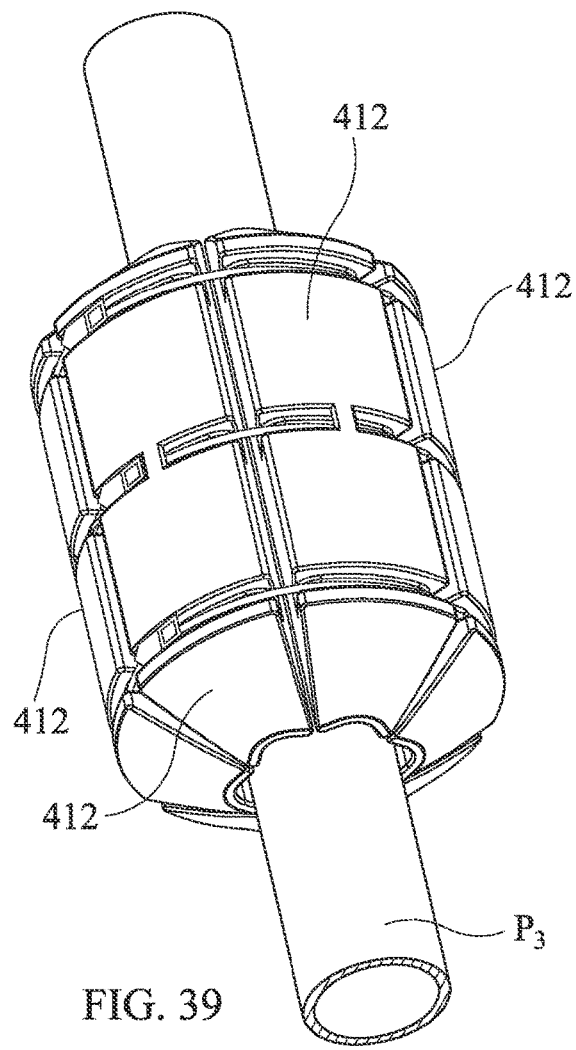
FIG. 39 is another perspective view of a slurry transporting riser assembly showing six buoyant devices strapped to and encircling a slurry pipe, the slurry pipe having a diameter (and radius) that is smaller than the slurry pipe depicted in FIG. 37 in accordance with the ninth embodiment.
Figure 40:
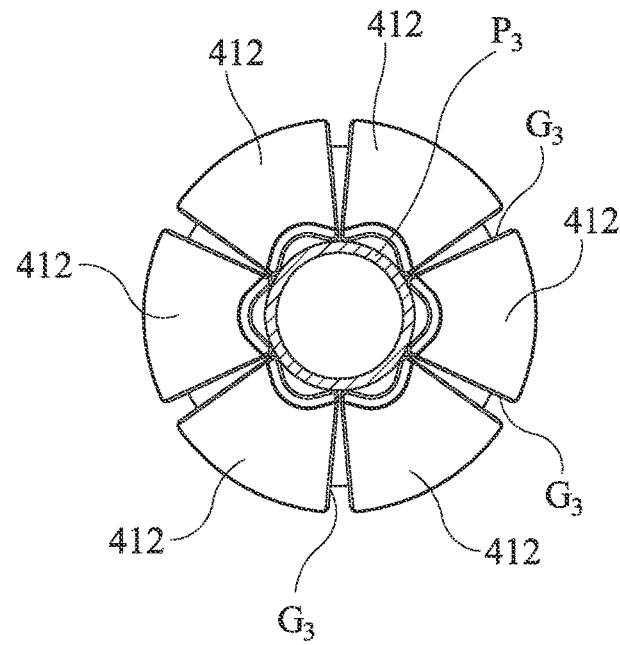
FIG. 40 is an end view of the slurry transporting riser assembly depicted in FIG. 39 showing the six buoyant devices strapped to and surrounding the slurry pipe showing small gaps between adjacent ones of the buoyant devices in accordance with the ninth embodiment.

In FIGS. 39 and 40, a plurality of buoyant devices 412 (six buoyant devices 412) are secured to the outer surface of a pipe $P_3$ that has an outer radius (diameter) that is smaller than the radius of the pipes $P_1$ and $P_2$. Consequently, the gaps $G_3$ in FIG. 40 differ from the gaps G and $G_2$ in FIGS. 37 and 38 in that the adjacent surfaces of the buoyant devices 412 along the gap $G_3$ are not parallel to one another. Rather, the gap $G_3$ have a triangular shape, as shown in FIG. 40.

Figure 41:
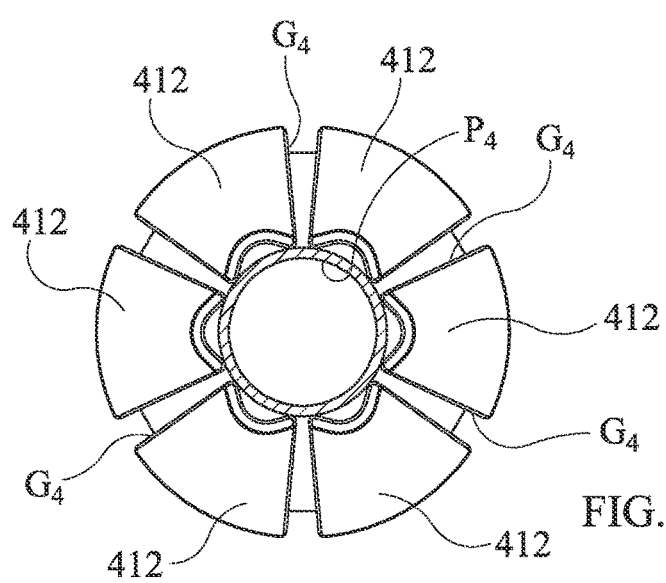
FIG. 41 is an end view of a slurry transporting riser assembly showing the six buoyant devices strapped to and surrounding a slurry pipe that is slightly larger than the slurry pipe shown in FIG. 40 such that gaps are defined between adjacent ones of the buoyant devices, the gaps in FIG. 41 being slightly larger than the gaps shown in FIG. 40 in accordance with the ninth embodiment.

In FIG. 41, a plurality of buoyant devices 412 are secured to the outer surface of a pipe $P_4$ that has an outer radius (diameter) that is slightly larger than the radius of the pipe $P_3$. Consequently, the gaps thin FIG. 41 differ from the gaps G, $G_2$ and $G_3$ in FIGS. 39 and 40 in that the adjacent surfaces of the buoyant devices 412 along the gap $G_3$ are almost parallel to one another.

Figure 42:
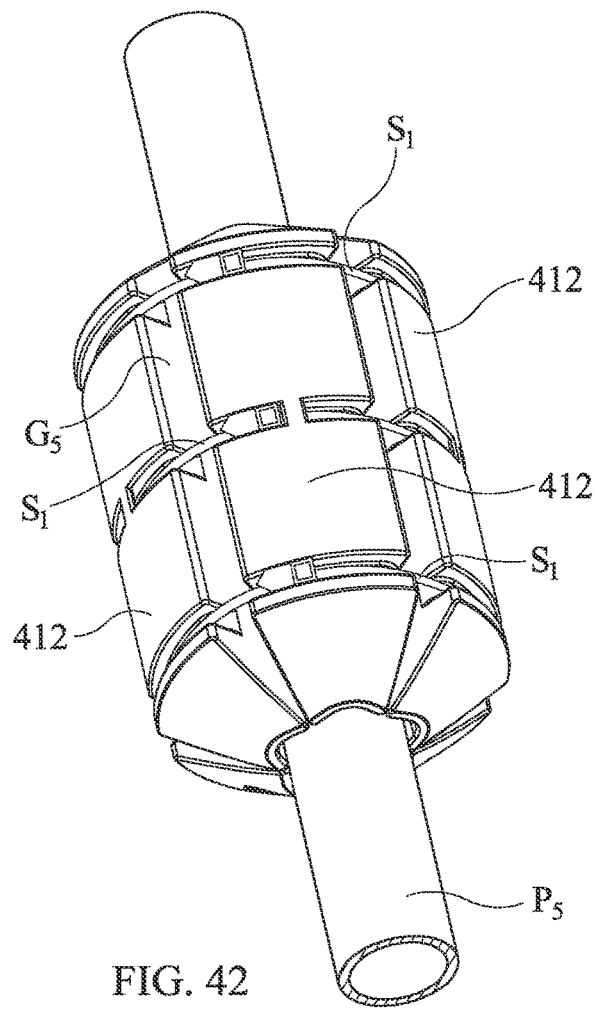
FIG. 42 is another perspective view of a slurry transporting riser assembly showing five buoyant devices strapped to and encircling a slurry pipe, the slurry pipe having a diameter (and radius) that is smaller than the slurry pipe depicted in FIG. 40 in accordance with the ninth embodiment.
Figure 43:
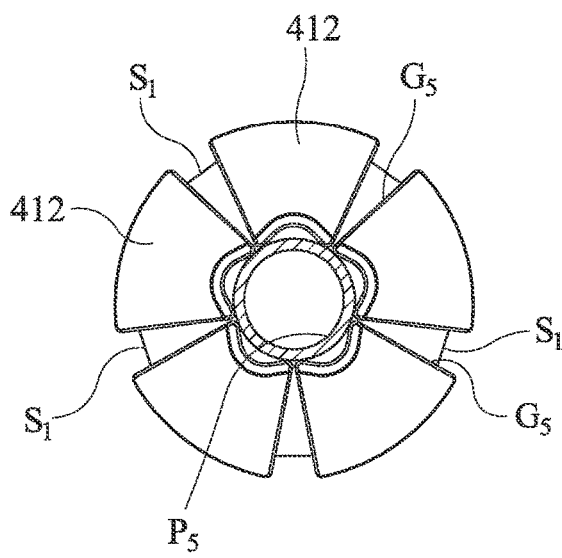
FIG. 43 is an end view of the slurry transporting riser assembly depicted in FIG. 42 showing the five buoyant devices strapped to and surrounding the slurry pipe showing small gaps between adjacent ones of the buoyant devices in accordance with the ninth embodiment.

In FIGS. 42 and 43, a plurality of buoyant devices 412 (five buoyant devices 412) are secured to the outer surface of a pipe $P_5$ that has an outer radius (diameter) that is smaller than the radius of the pipes $P_3$ and $P_4$. Consequently, the gaps $G_5$ in FIG. 43 differ from other gaps in that the adjacent surfaces of the buoyant devices 412 along the gap $G_5$ are again not parallel to one another. Rather, the gap $G_5$ have a triangular shape, as shown in FIG. 43.

Figure 44:
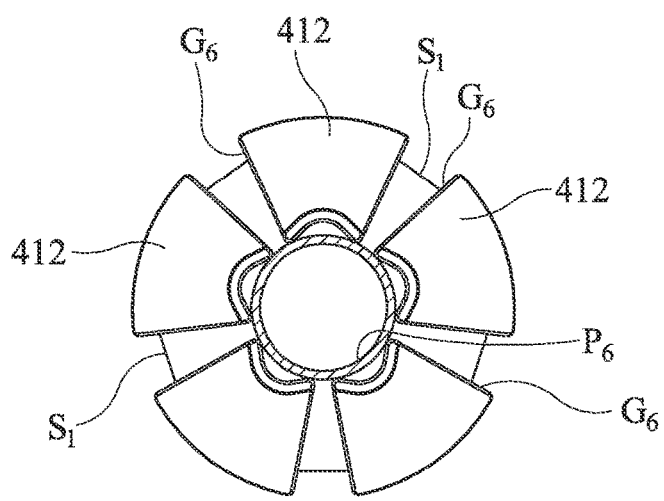
FIG. 44 is an end view of a slurry transporting riser assembly showing the five buoyant devices strapped to and surrounding a slurry pipe that is slightly larger than the slurry pipe shown in FIG. 43 such that gaps are defined between adjacent ones of the buoyant devices, the gaps in FIG. 44 being slightly larger than the gaps shown in FIG. 43 in accordance with the ninth embodiment.

In FIG. 44, a plurality of buoyant devices 412 (five buoyant devices 412) are secured to the outer surface of a pipe $P_4$ that has an outer radius (diameter) that is slightly larger than the radius of the pipe $P_3$. Consequently, the gaps 64 in FIG. 41 differ from the gaps G, $G_2$ and $G_3$ in FIGS. 39 and 40 in that the adjacent surfaces of the buoyant devices 412 along the gap $G_3$ are almost parallel to one another.

Figure 45:
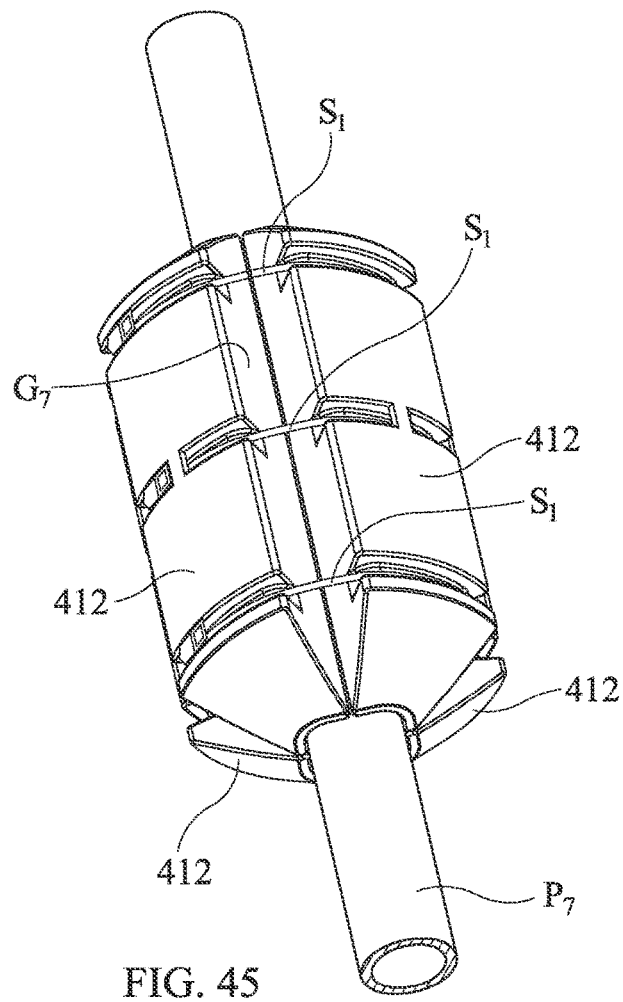
FIG. 45 is another perspective view of a slurry transporting riser assembly showing four buoyant devices strapped to and encircling a slurry pipe, the slurry pipe having a diameter (and radius) that is smaller than the slurry pipe depicted in FIG. 43 in accordance with the ninth embodiment.
Figure 46:
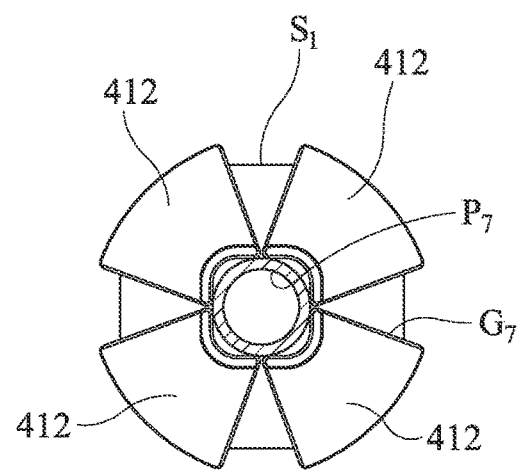
FIG. 46 is an end view of the slurry transporting riser assembly depicted in FIG. 45 showing the four buoyant devices strapped to and surrounding the slurry pipe showing gaps between adjacent ones of the buoyant devices in accordance with the ninth embodiment.

In FIGS. 45 and 46, a plurality of buoyant devices 412 (four buoyant devices 412) are secured to the outer surface of a pipe $P_7$ that has an outer radius (diameter) that is smaller than the radius of the pipes $P_5$ and $P_6$. Straps $S_1$ secure the buoyant devices 412 to one another and surround the pipe $P_7$. Consequently, gaps $G_7$ in FIG. 46 differ in dimensions from other gaps in that outer most portions of the adjacent surfaces of the buoyant devices 412 along the gap $G_7$ are further apart from one another than in FIGS. 36-44 and again not parallel to one another. Rather, the gaps $G_7$ have triangular shapes, as shown in FIG. 46.

Figure 47:
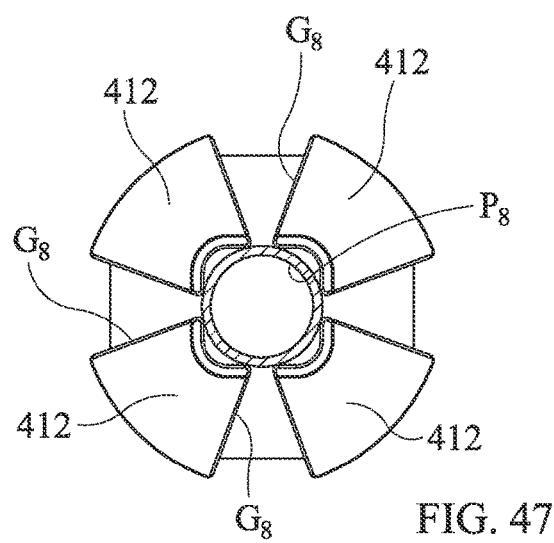
FIG. 47 is an end view of a slurry transporting riser assembly showing the four buoyant devices strapped to and surrounding a slurry pipe that is slightly larger than the slurry pipe shown in FIG. 46 such that gaps are defined between adjacent ones of the buoyant devices, the gaps in FIG. 47 being slightly larger than the gaps shown in FIG. 46 in accordance with the ninth embodiment.

In FIG. 47, a plurality of buoyant devices 412 (four buoyant devices 412) are secured to the outer surface of a pipe $P_8$ that has an outer radius (diameter) that is slightly larger than the radius of the pipe $P_7$. Consequently, the gaps $G_8$ in FIG. 47 differ from the gaps $G_4$, $G_5$ and $G_6$.

Figure 48:
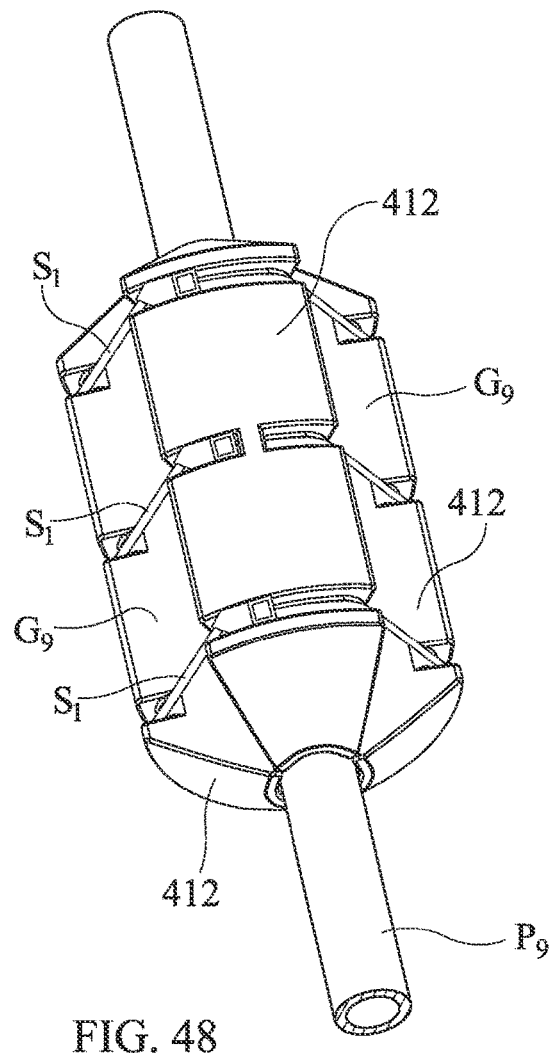
FIG. 48 is a perspective view of a slurry transporting riser assembly showing three buoyant devices strapped to and encircling a slurry pipe, the slurry pipe having a diameter (and radius) that is smaller than the slurry pipe depicted in FIG. 46 in accordance with the ninth embodiment.
Figure 49:
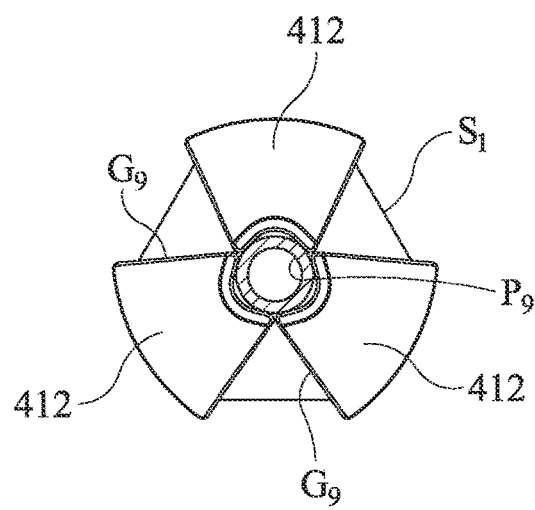
FIG. 49 is an end view of the slurry transporting riser assembly depicted in FIG. 48 showing the three buoyant devices strapped to and surrounding the slurry pipe showing gaps between adjacent ones of the buoyant devices in accordance with the ninth embodiment.
Figure 50:
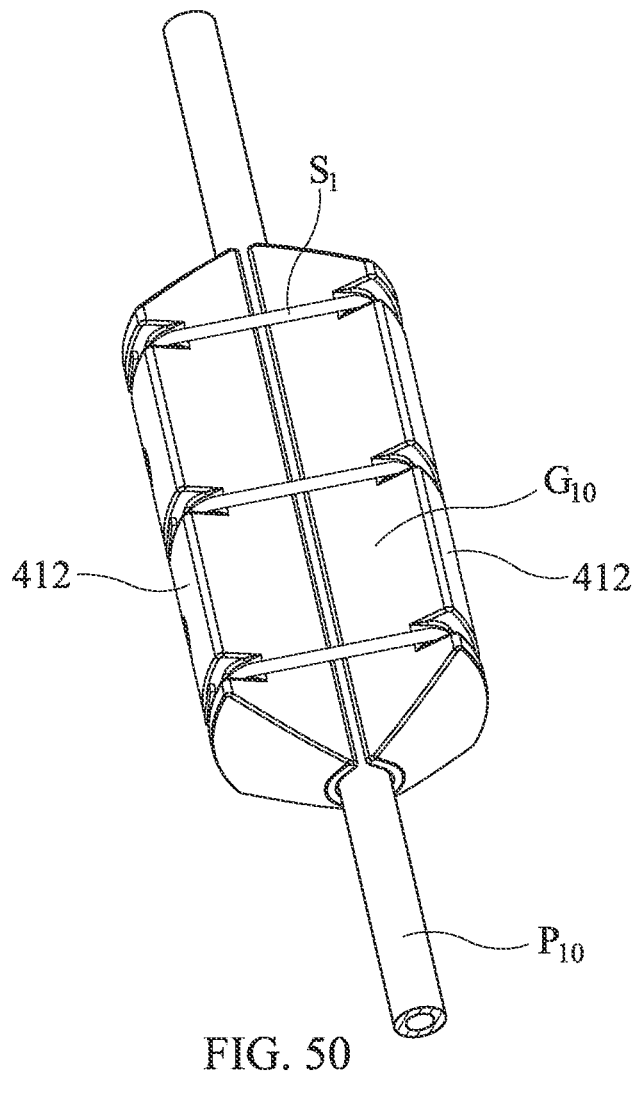
FIG. 50 is a perspective view of a slurry transporting riser assembly showing two buoyant devices strapped to opposite sides of a slurry pipe, the slurry pipe having a diameter (and radius) that is smaller than the slurry pipe depicted in FIG. 49 in accordance with the ninth embodiment.
Figure 51:
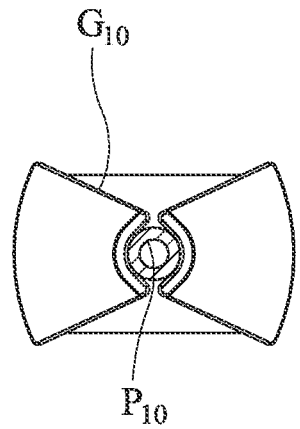
FIG. 51 is an end view of the slurry transporting riser assembly depicted in FIG. 50 showing the two buoyant devices strapped to and surrounding the slurry pipe showing large gaps between adjacent ones of the buoyant devices in accordance with the ninth embodiment.

In FIGS. 48 and 49, a plurality of buoyant devices 412 (three buoyant devices 412) are secured to the outer surface of a pipe $P_9$ that has an outer radius (diameter) that is smaller than the radius of the pipes $P_7$ and $P_8$. Straps $S_1$ secure the buoyant devices 412 to one another and surround the pipe P$_9$. Consequently, gaps G$_9$ in FIG. 49 differ in dimensions from other gaps in that outer most portions of the adjacent surfaces of the buoyant devices 412 along the gap G$_7$ are further apart from one another than in FIGS. 36-47 and again not parallel to one another. Rather, the gaps G$_9$ have large triangular shapes, as shown in FIG. 51.

Figure 52:
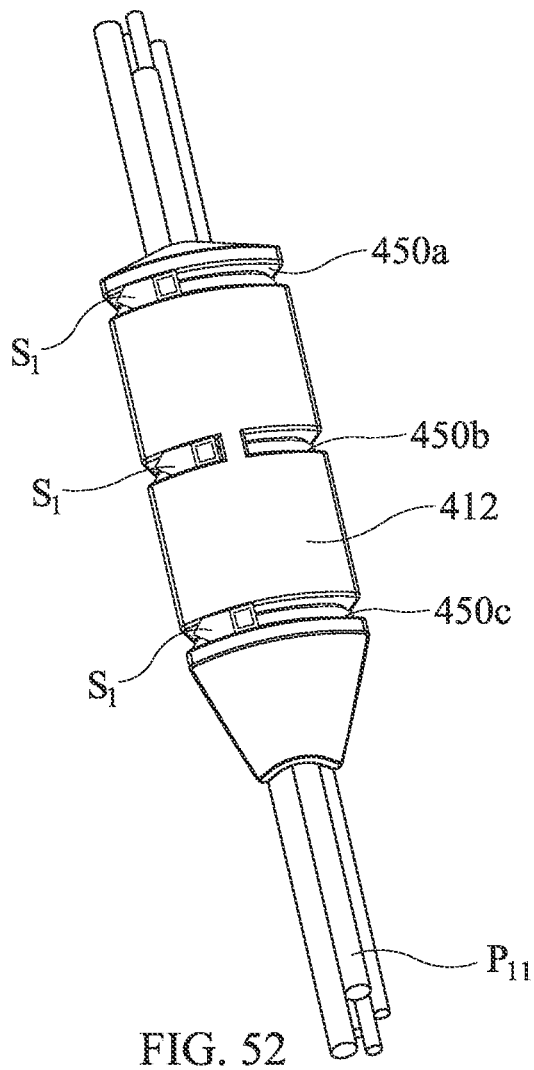
FIG. 52 is a perspective view of a slurry transporting riser assembly showing one buoyant device strapped to an array of slurry pipes, the slurry pipes all having a diameter (and radius) that is smaller than the slurry pipe depicted in FIG. 51 in accordance with the ninth embodiment.
Figure 53:
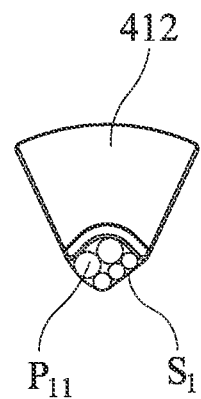
FIG. 53 is an end view of the slurry transporting riser assembly depicted in FIG. 52 showing the one buoyant device strapped to the slurry pipes in accordance with the ninth embodiment.

In FIGS. 52 and 53, a single buoyant device 412 is secured to the outer surface of one pipe or a cluster of small pipes P$_{11}$ that has an outer radius (diameter) that is smaller than the radius of the pipe P$_{10}$. Straps S$_1$ secure the buoyant device 412 to the pipe clamping the buoyant devices 412 thereto.

Figure 55:
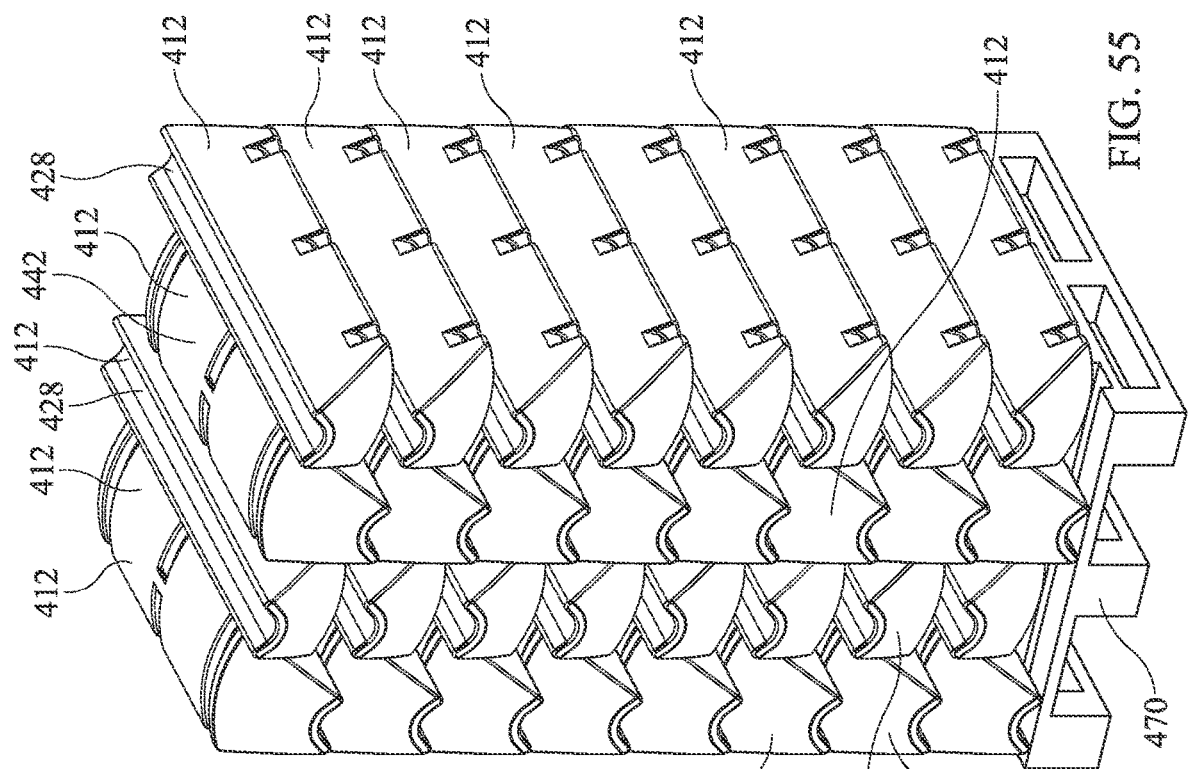
FIG. 55 is a perspective view of the pallet or cargo carrier with the rows of buoyant devices stacked thereon for shipping, in accordance with the ninth embodiment.
Figure 54:
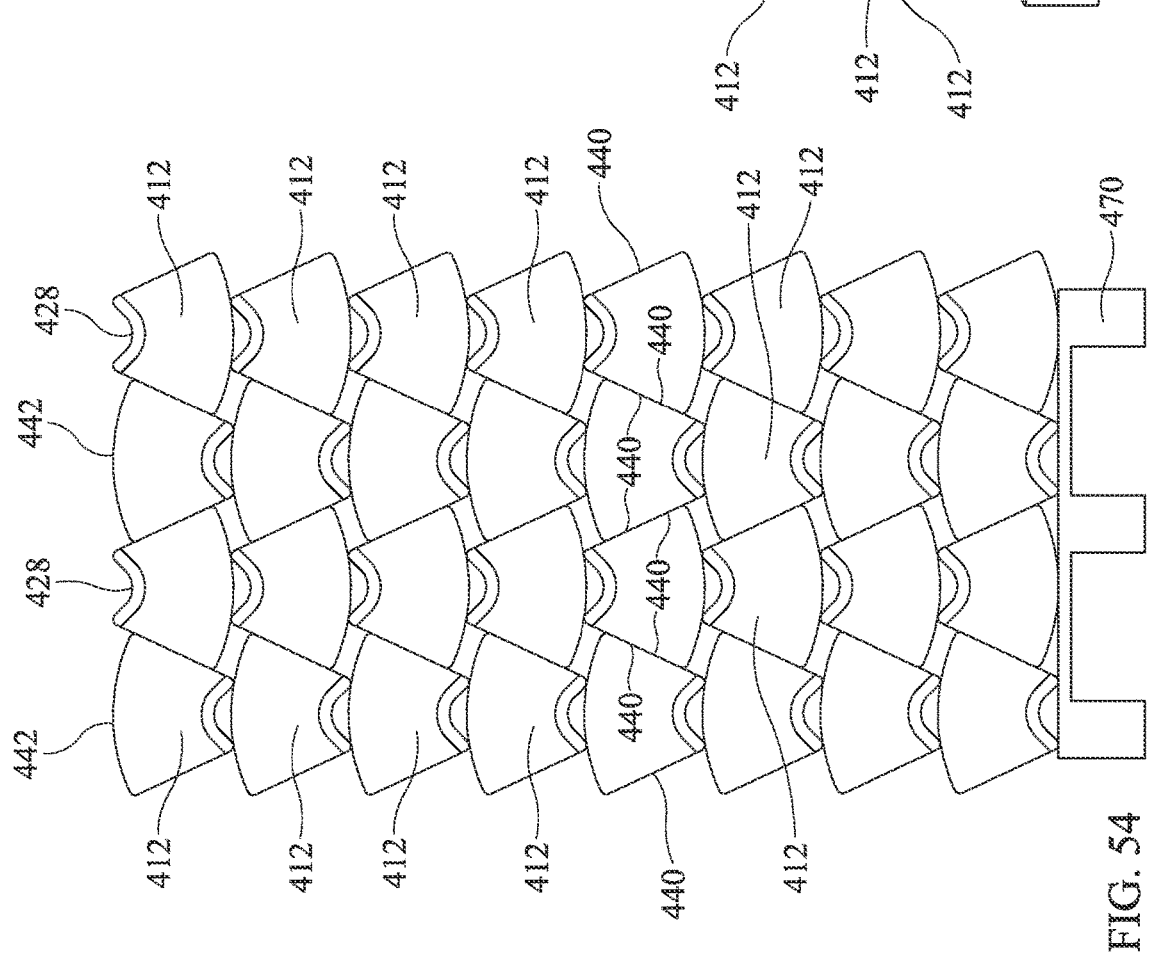
FIG. 54 is an end view of a pallet or cargo carrier with rows of buoyant devices stacked thereon for shipping, each row of buoyant devices including alternating ones of upside up and upside down for efficient use of space on the pallet or cargo carrier in accordance with the ninth embodiment.

As shown in FIGS. 54 and 55, the shape and dimensions of the buoyant device 412 are such that a plurality of the buoyant devices 412 can be easily and compactly laid onto a pallet or cargo carrier 470 without the need of cradles or special fixtures. Instead, each row of buoyant devices 412 include alternating ones with the convex surface section 442 facing upward and concaved section 428 facing upward. The side surface sections 400 are drawn against one another in a tight compact arrangement. Shipping straps S$_2$ tightly wrap around the plurality of buoyant devices 412 and the pallet or cargo carrier 470 keeping the plurality of buoyant devices 412 secure and easily moved for shipping.

Tenth Embodiment

Referring now to FIGS. 56-59, a buoyant device 412' in accordance with a tenth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

Figure 56:
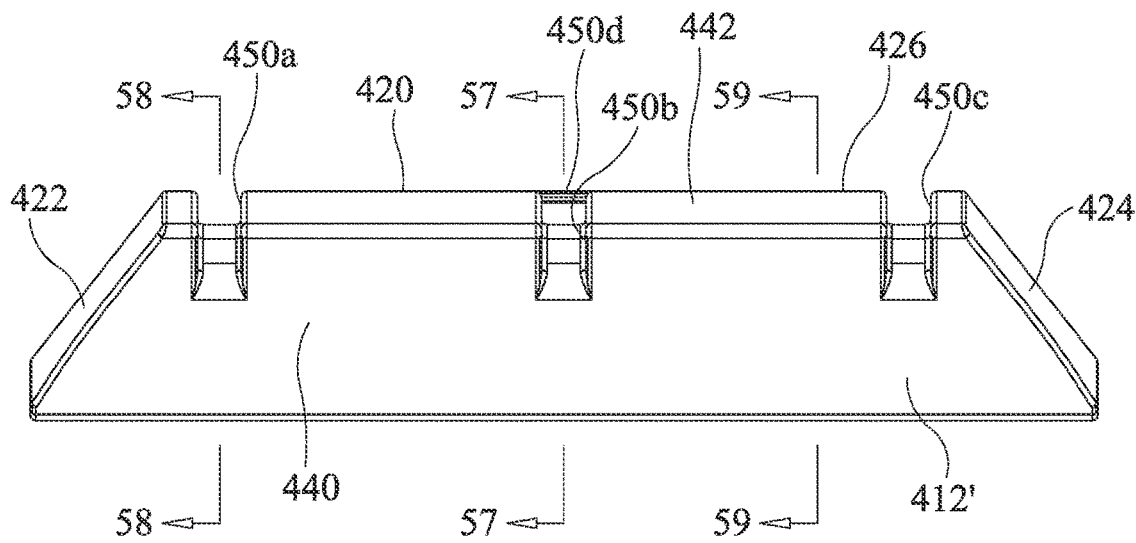
FIG. 56 is a side view of a buoyant device in accordance with a tenth embodiment.

The buoyant device 412' in the tenth embodiment has all the features of the ninth embodiment such as the outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 56. The buoyant device 412' also includes the strap receiving recesses 450*a*, 450*b* and 450*c*.

Figure 57:
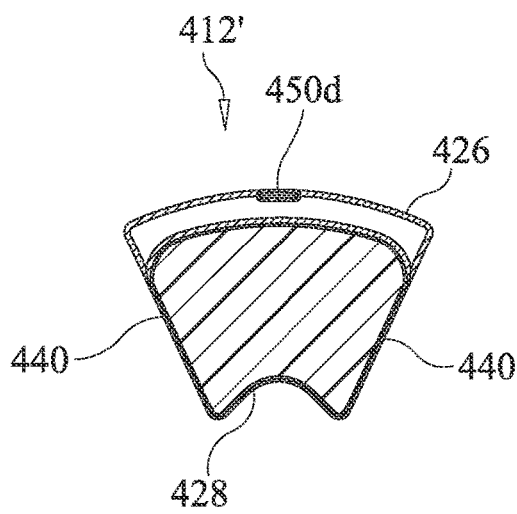
FIG. 57 is a cross-sectional view of the buoyant device taken along the line 57-57 in FIG. 56 in accordance with the tenth embodiment.
Figure 58:
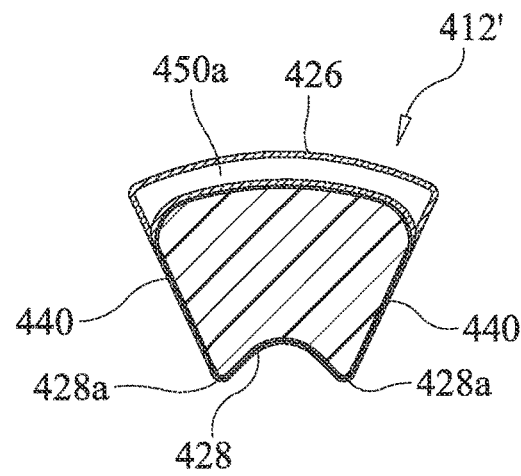
FIG. 58 is another cross-sectional view of the buoyant device taken along the line 58-58 in FIG. 56 in accordance with the tenth embodiment.
Figure 59:
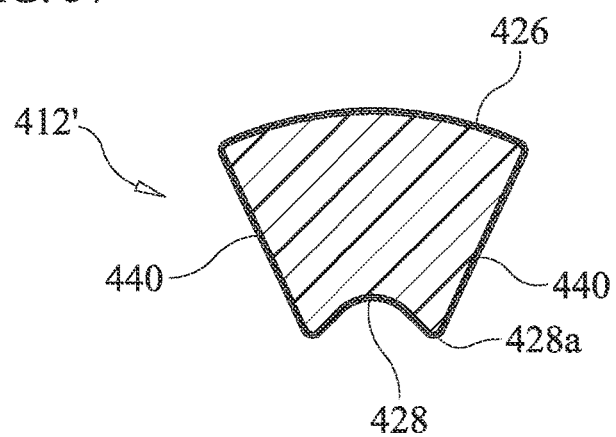
FIG. 59 is yet another cross-sectional view of the buoyant device taken along the line 59-59 in FIG. 56 in accordance with the tenth embodiment.

However, as shown in FIGS. 57-59, the buoyant device 412' is not hollow in the tenth embodiment. Rather, the buoyant device 412' is filled with a highly buoyant foam material, such as, for example, expandable polyurethane, polystyrene or other light weight material that ensures buoyancy of the buoyant device 12. The outer surface 420 of the buoyant device 412' defines an outer wall 420 (outer surface) of the buoyant device 412'. The outer wall 420 can be formed from metallic materials or by any of a variety of plastic or polymers materials suitable for use in marine environments.

Eleventh Embodiment

Referring now to FIGS. 60-64, a buoyant device 412" in accordance with an eleventh embodiment will now be explained. In view of the similarity between the first and tenth embodiments, the parts of the eleventh embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

Figure 60:
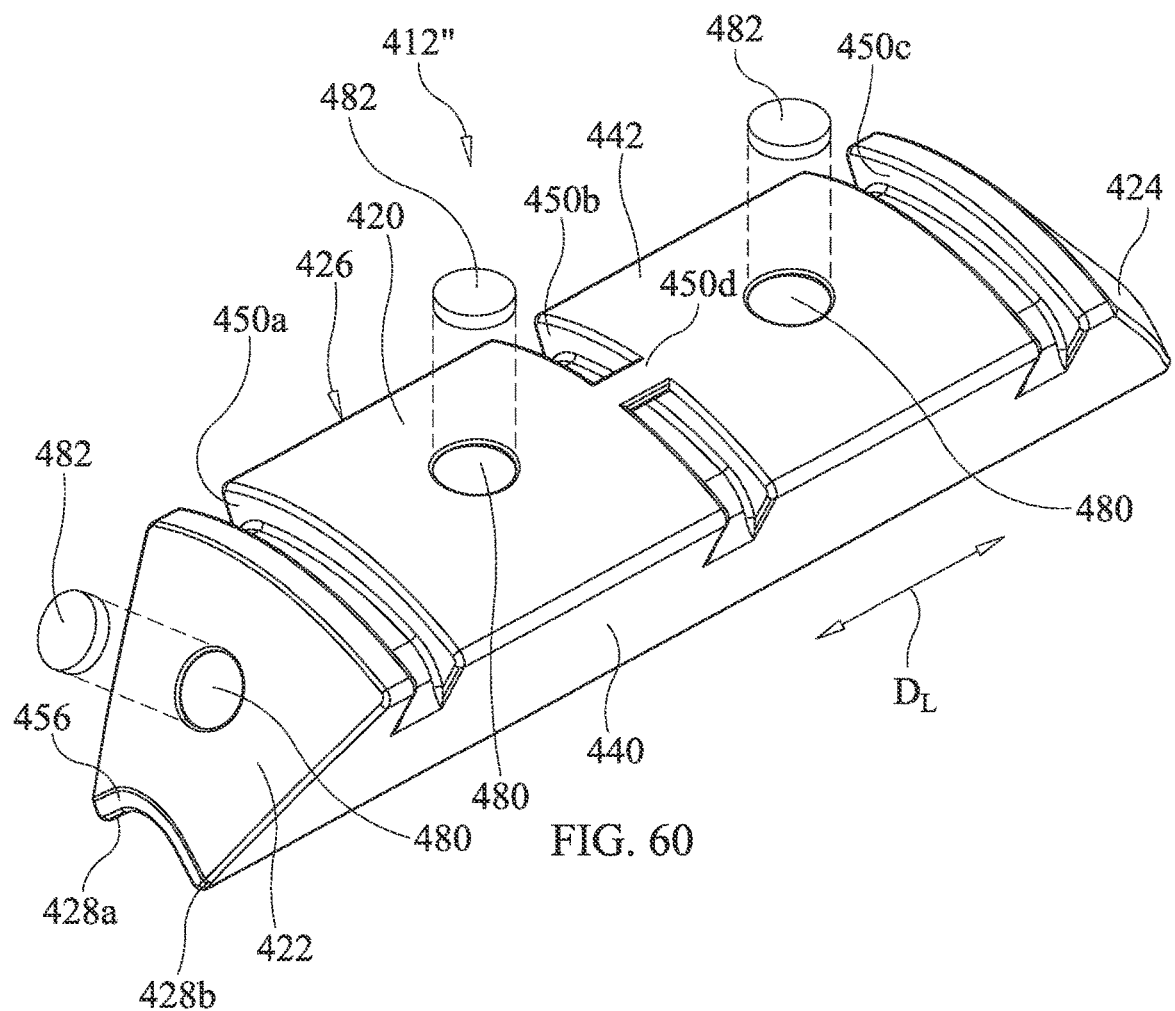
FIG. 60 is a perspective view of a buoyant device showing concaved areas dimensioned to receive lights or beacons on various surfaces thereof in accordance with an eleventh embodiment.
Figure 61:
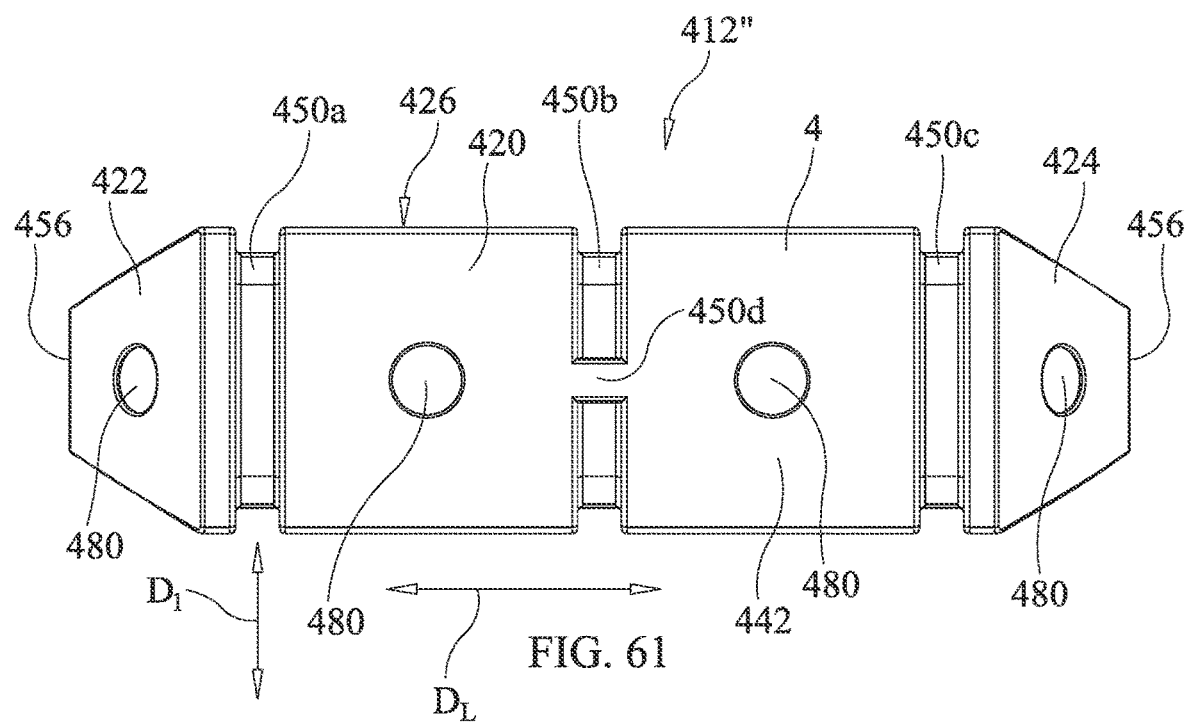
FIG. 61 is a top view of the buoyant device depicted in FIG. 60 showing the concaved areas in accordance with the ninth embodiment.
Figure 62:
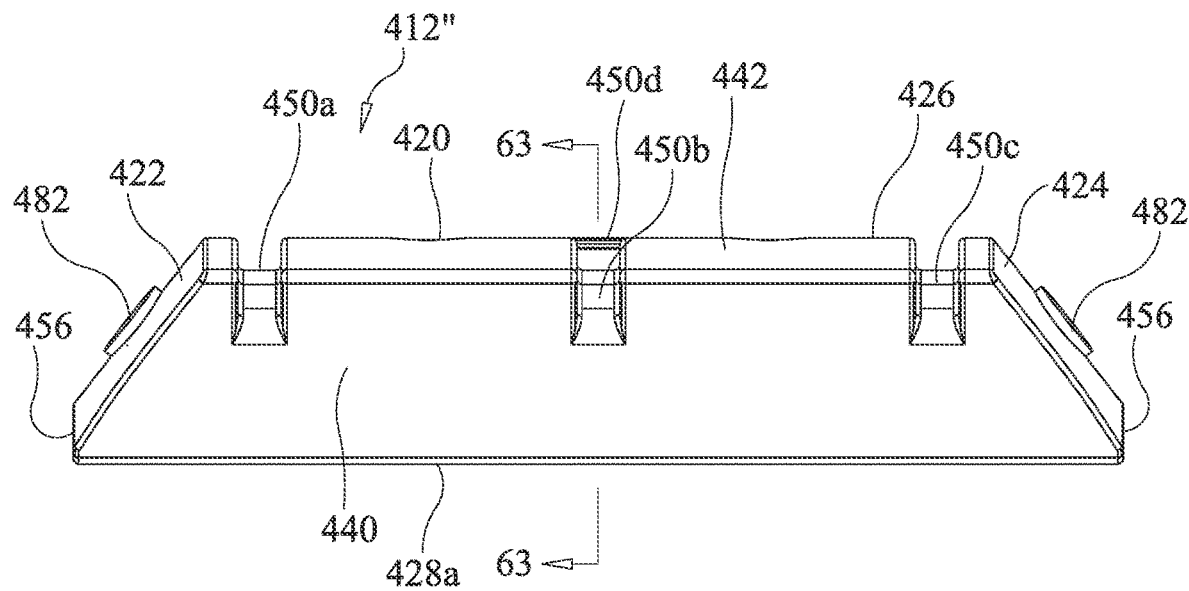
FIG. 62 is a side view of the buoyant device depicted in FIGS. 60-61 in accordance with the ninth embodiment.
Figure 63:
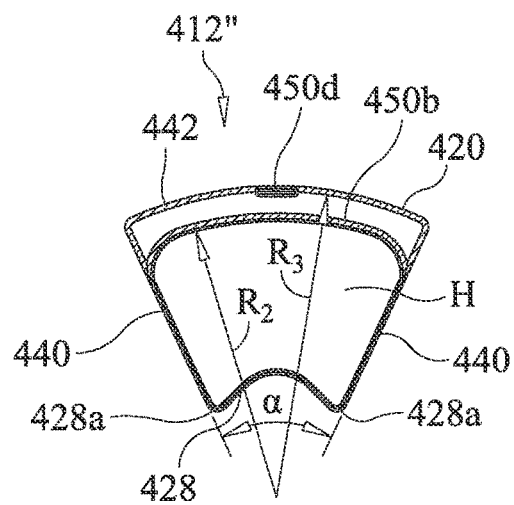
FIG. 63 is a cross-sectional view of the buoyant device taken along the line 63-63 in FIG. 62 in accordance with the ninth embodiment.
Figure 64:
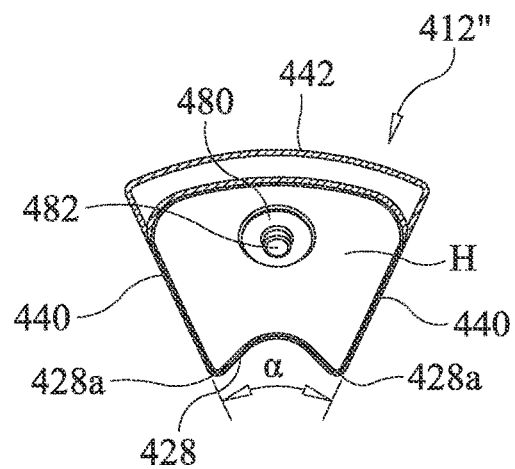
FIG. 64 is an end view of the buoyant device taken in accordance with the ninth embodiment.

The buoyant device 412" in the eleventh embodiment has all the features of the ninth and tenth embodiments such as the outer surface 420 with a first end portion 422, a second end portion 424 and an elongated portion 426. Each of the first end portion 422 and the second end portion 424 of the outer surface 420 of the buoyant device 412 has a tapering semi-conical shape, as shown in FIG. 60. The buoyant device 41' also includes the strap receiving recesses 450*a*, 450*b* and 450*c*.

However, in the eleventh embodiment, the buoyant device 412" includes a plurality of recessed areas 480 that can be fitted with lights or beacons 482.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the slurry transporting riser assembly. Accordingly, these terms; as utilized to describe the present invention should be interpreted relative to a vehicle equipped with the slurry transporting riser assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art; alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed:

1. A float apparatus, comprising
    a buoyant device having an outer surface with a first end portion, a second end portion and an elongated portion that extends from the first end portion to the second end portion, the elongated portion of the outer surface having a concaved section that extends from the first end portion to the second end portion, the concaved section defining a shape that has an inner radius between opposite edges and faces an outer radius of a conduit such that with the buoyant device attached to the conduit the concaved section contacts the conduit, the outer surface of the buoyant device including a convex section opposite the concaved section, and two flat surface sections, each flat surface section extending between a corresponding edge of the convex section to the concaved section, the flat surface sections being angularly offset from one another defining an acute angle therebetween, the convex section including at least one strap receiving recess, and the buoyant device configured to removably attach to different numbers of identical buoyant devices to radially encircle conduits having different larger outer radiuses than the inner radius of the concaved section by a strap inserted into the respective strap receiving recesses of the buoyant device and the identical buoyant devices which causes the opposite edges of the concaved section to contact the larger outer radiuses with a space between an intermediate portion of the concaved section and the larger outer radiuses.

2. The float apparatus according to claim 1, wherein each of the first end portion and the second end portion of the outer surface of the buoyant device has a tapering semi-conical shape.

3. The float apparatus according to claim 1, wherein the acute angle is between 45 and 55 degrees.

4. The float apparatus according to claim 3, wherein the acute angle is approximately 50 degrees.

5. The float apparatus according to claim 1, wherein the at least one strap receiving recess extends in a direction perpendicular to a lengthwise direction of the convex section.

6. The float apparatus according to claim 1, wherein the convex section includes a plurality of strap receiving recesses that extend in directions perpendicular to a lengthwise direction of the convex section.

7. The float apparatus according to claim 1, wherein the buoyant device has a wedge-like shape as viewed from the first end portion and the second end portion.

8. The float apparatus according to claim 1, wherein the buoyant device has a hollow interior.

9. The float apparatus according to claim 1, wherein the buoyant device is at least partially filled with a foam material.

10. The float apparatus according to claim 1, wherein the convex section and the concaved section have a curved shape as viewed from the first end portion and the second end portion.

11. The float apparatus according to claim 1, wherein the at least one strap receiving recess includes a bridge portion that covers at least a portion of thereof to define a tunnel within the at least one strap receiving recess.

12. The float apparatus according to claim 1, wherein the at least one strap receiving recess includes a first strap receiving recess with a bridge portion that covers at least a portion thereof to define a tunnel within the first strap receiving recess and a second strap receiving recess without a corresponding bridge portion.

13. A float apparatus, comprising
a conduit with at least a portion thereof having a cylindrically shaped outer surface that defines an outer radius; and a buoyant device having an outer surface with a first end portion, a second end portion and an elongated portion that extends from the first end portion to the second end portion, the buoyant device being shaped and configured to attach to the conduit, the elongated portion of the outer surface having a concaved section that extends from the first end portion to the second end portion, the concaved section defining a shape that has an inner radius between opposite edges and faces the outer radius of the conduit, the buoyant device being attached to the conduit with a portion of the conduit being located within the concaved section of the buoyant device, the outer surface of the buoyant device including a convex section opposite the concaved section, and two flat surface sections, each flat surface section extending between a corresponding edge of the convex section to a corresponding edge of the concaved section, the flat surface sections being angularly offset from one another defining an acute angle therebetween, the convex section including at least one strap receiving recess, and the buoyant device configured to removably attach to a plurality of of identical buoyant devices to radially encircle the outer radius of the conduit by a strap inserted into the respective strap receiving recesses of the buoyant device and the identical buoyant devices which causes the opposite edges of the concaved section to contact the outer radius of the conduit with a space between an intermediate portion of the concaved section and the outer radius of the conduit.

14. The float apparatus according to claim 13, wherein each of the first end portion and the second end portion of the outer surface of the buoyant device has a tapering semi-conical shape.

15. The float apparatus according to claim 13, wherein the acute angle is approximately 50 degrees.

16. The float apparatus according to claim 13 wherein the at least one strap receiving recess extends in a direction perpendicular to a lengthwise direction of the convex section.

17. The float apparatus according to claim 16, wherein a plurality of the buoyant devices are attached to the conduit surrounding the conduit and being fixed to one another by at least one strap that extends into the at least one strap receiving recess of each of the plurality of the buoyant devices.

18. The float apparatus according to claim 13, wherein the buoyant device has a hollow interior.

19. The float apparatus according to claim 13, wherein the buoyant device is at least partially filled with a foam material.

20. The float apparatus according to claim 13, wherein the at least one strap receiving recess includes a bridge portion that covers at least a portion thereof to define a tunnel within the at least one strap receiving recess.

\* \* \* \* \*